CALL-FOR-SERVICE CIRCUITS OF COMMUNICATION SWITCHING MARKER

Filed Dec. 29, 1965

INVENTOR
JOHN R. VANDE WEGE

BY Bernard E. Franz

ATTY.

June 24, 1969 J. R. VANDE WEGE 3,452,159

CALL-FOR-SERVICE CIRCUITS OF COMMUNICATION SWITCHING MARKER

Filed Dec. 29, 1965 Sheet 7 of 15

June 24, 1969 J. R. VANDE WEGE 3,452,159

CALL-FOR-SERVICE CIRCUITS OF COMMUNICATION SWITCHING MARKER

Filed Dec. 29, 1965 Sheet 8 of 15

POSITION CIRCUIT

June 24, 1969 J. R. VANDE WEGE 3,452,159

CALL-FOR-SERVICE CIRCUITS OF COMMUNICATION SWITCHING MARKER

Filed Dec. 29, 1965 Sheet 13 of 15

United States Patent Office 3,452,159
Patented June 24, 1969

3,452,159
CALL-FOR-SERVICE CIRCUITS OF COMMUNICATION SWITCHING MARKER

John R. Vande Wege, Glen Ellyn, Ill., assignor to Automatic Electric Laboratories, Inc., Northlake, Ill., a corporation of Delaware Filed Dec. 29, 1965, Ser. No. 517,226
Int. Cl. H04m 3/64
U.S. Cl. 179—27 8 Claims

ABSTRACT OF THE DISCLOSURE

Switching equipment selectively connects trunk circuits to operator positions. Trunk circuits calling for service have class and priority information. The marker supplies blanking potentials to mask the call-for-service requests of all but one class and priority at a time. When the trunk circuit is connected to an operator position, the class and priority information is forwarded via a time division path for display. The marker is arranged to have a sequence of operations which is similar for service requests from the operator positions and from the trunk circuits.

This invention relates to a communication switching marker, and more particularly to a class of service marking arrangement.

One object of the invention is to provide a simple and effective arrangement to mark trunks terminating on a switching network so that calls can be processed in accordance with class of service information such as priority or operator class of call information.

According to one feature of the invention a plurality of class marking leads are connected in common between the marker and all of the trunk circuits, and each trunk circuit is provided with an arrangement to open a connection between one of the class marking leads corresponding to class of service information for the call and a calling conductor in the trunk. A call for service signal comprises connecting a given source of potential to the calling conductor in the trunk, this conductor being connected via an identification network into an identification selection arrangement in the marker. The marker in serving trunk calls for service operates a scanner to place a different potential on the one class marking conductor corresponding to the class of service to be served; this being the conductor which is disconnected from the calling conductor in all trunks having calls of that class of service. Thus this second potential is applied to the calling conductor of all trunks except those of the class of service selected by the marker and effectively blanks the call signals in all of the other trunks. For example the call signal may be a negative potential supplied via resistance to the calling conductor, and the blanking potential connected by the marker to the class conductor for the selected class of service may be ground potential.

Another feature relates to the arrangement of the sequence control in the marker such that calls from trunk circuits terminating one side of a switching network are processed with a given sequence of operations, and calls from circuits terminating at the other side of the network are processed with substantially the same sequence of operation. For example, in a network having trunk circuits terminating one side and link circuits for operator positions terminating at the other side, the normal sequence is for calls originating at trunks being extended to the operator link circuit. The marker is arranged so that in a switchboard mode, calls originated by operators are processed with substantially the same sequence of operations as calls originating at the trunks. This is accomplished by responding to a switchboard call for service to mark all idle trunks as though they were calling for service, and to mark only the calling operator positions as idle. The call is then processed to select one of the trunks which has the call potential appearing on its call conductor and to extend it to a position which appears marked idle. Thus, the calling position is connected to an idle trunk.

The above-mentioned and other objects and features of this invention and the manner of attaining them will become more apparent, and the invention itself will be best understood, by reference to the following description of an embodiment of the invention taken in conjunction with the accompanying drawings comprising FIGS. 1 to 17 wherein;

FIGS. 1 and 2 comprise a symbolic diagram of a dial service assistance trunk and operator position group with a connecting switching network;

Figure 1:
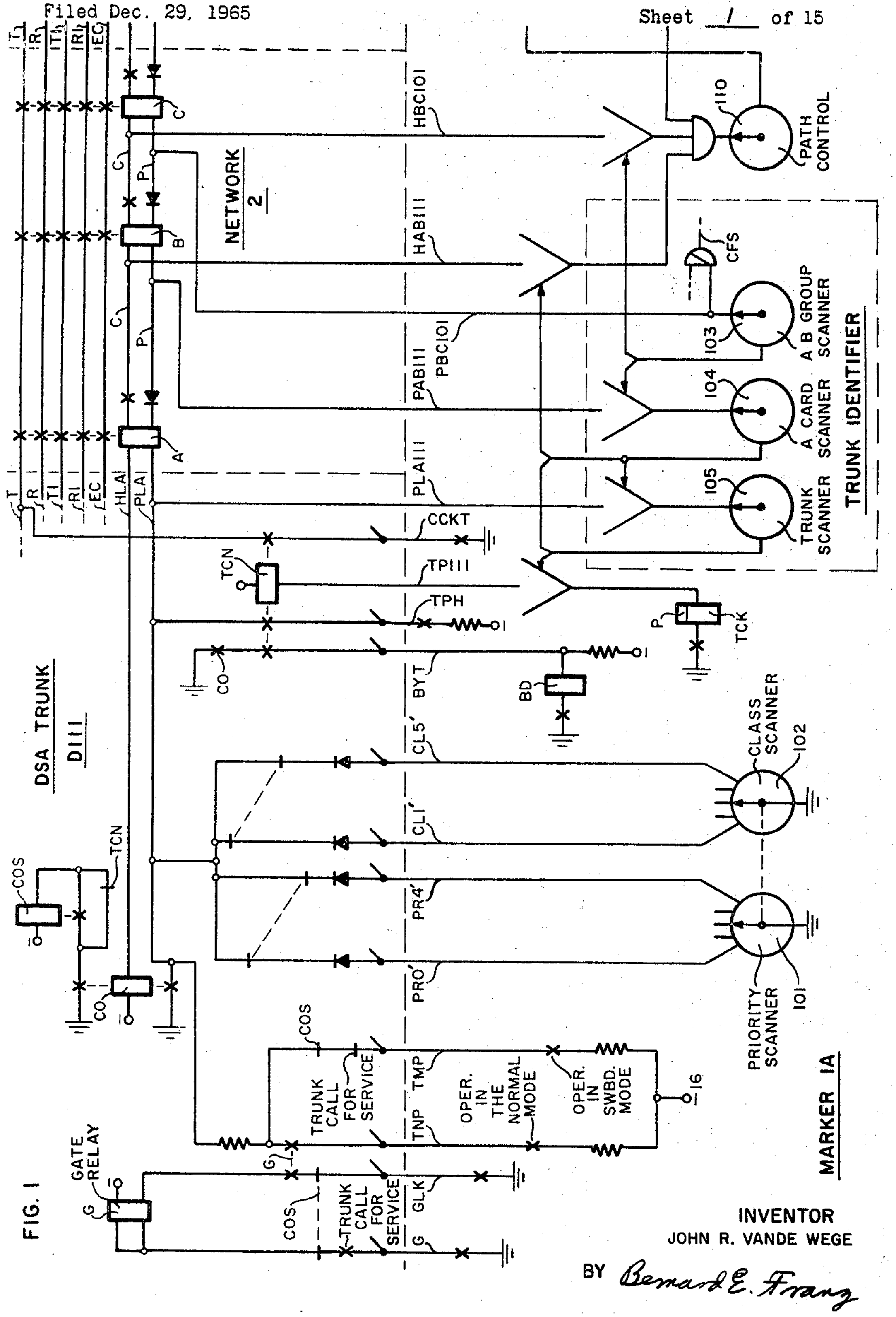
Figure 2:
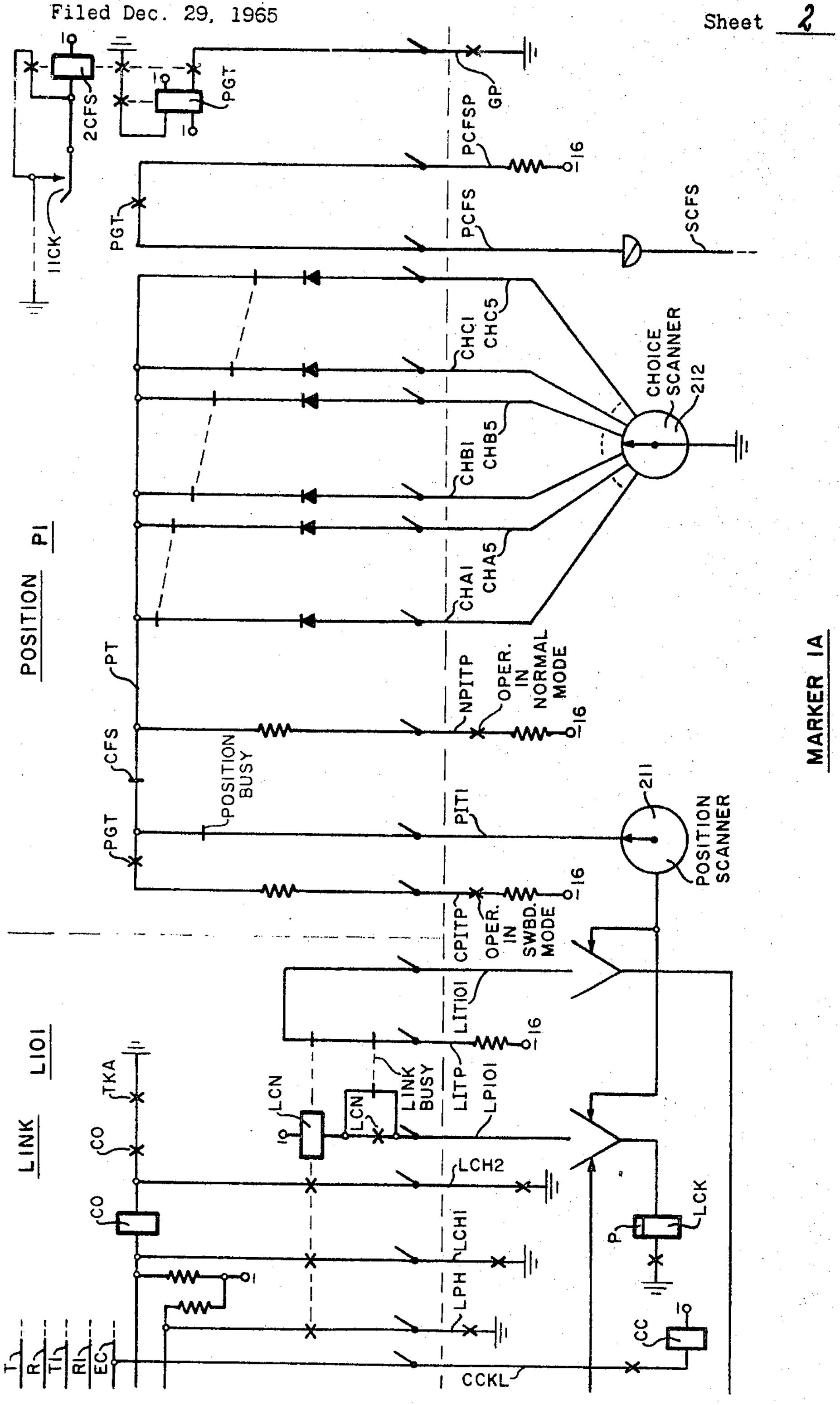
Figure 15:
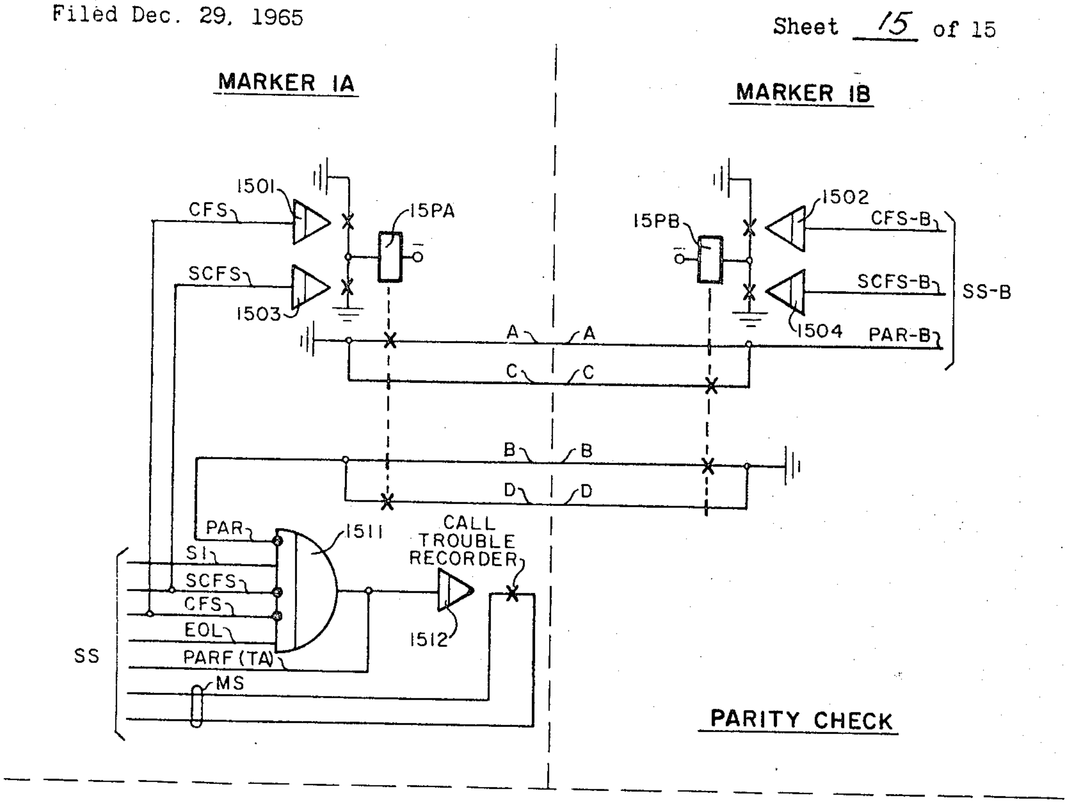
Figure 16:
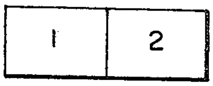

FIGS. 5–14 comprise a block and schematic diagram of the dial service assistance group shown symbolically in FIGS. 1 and 2;

FIG. 15 is a schematic and functional block diagram of a parity check arrangement;

FIG. 16 shows how FIGS. 1 and 2 are to be arranged; and

Figure 17:
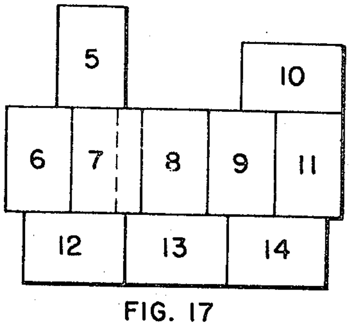

FIG. 17 shows how FIGS. 5–14 are to be arranged.

The following references are of interest with respect to the communication switching system in which this invention is incorporated and features thereof:

(1) Technical Bulletin 950–330 entitled, Autovon Switch, published by Automatic Electric Company, 1964.

(2) U.S. patent application Ser. No. 450,275, filed Apr. 23, 1965, now Patent No. 3,328,534 for Communication Switching System, by R. J. Murphy et al.

(3) U.S. patent application Ser. No. 463,587, filed June 14, 1965, now Patent No. 3,413,421 for Identifying Arrangement for Communication Switching Systems, by A. S. Cochran and F. B. Sikorski.

(4) U.S. Patent 3,211,837 issued Oct. 12, 1965, for Line Identifier Arrangement for Communication Switching System, by L. Bruglemans.

(5) U.S. Patent 3,170,041 issued Feb. 16, 1965 for Communication Switching System, by K. K. Spellnes.

References 1 and 2 describe the system in which the invention is incorporated. Reference 3 covers a line identification arrangement for the terminals of the main switch network of the system, and also includes the description of these terminal circuits. Reference 4 describes a line identification arrangement similar to that used in the dial service assistance group of this application. Reference 5 covers a prior switching system and includes a list of several U.S. patent applications at the end thereof; which are of interest with respect to the logic circuits, flip-flops, and other building blocks used in the system described in the present application.

In describing the apparatus in the system various conventions have been used. For example, a minus sign adjacent a small circle representing a terminal indicates —50 volt connection from the exchange battery. A specific number along with the sign adjacent a terminal indicates that value of voltage from an electronic power supply, for example —16 indicates a negative 16-volt potential connection. The relay circuits used in the system include both conventional telephone type relays in which an armature attracted by a core actuates a plurality of contact sets, and also relays of the reed type in which the contact sets are in sealed reed capsules encircled by the relay winding or windings. There is no indication in the present disclosure distinguishing these two types of relays since this fact is not pertinent to the invention. While the relays are shown with large numbers of contact sets, in actual practice slave or parallel connected relays may be used to actuate some of these contacts.

The electronic logic circuitry used in this system is direct-coupled (D.C.), that is, signals are represented by steady-state voltages. Two levels are employed. The first level is a negative potential, and represents the binary one, true, on, or active condition. The second level is ground potential and represents the binary zero, false off, or inactive condition. These logic circuits along with flip-flops for counting and register purposes are used in the various scanners disclosed herein in block diagram form.

The logical circuits use NOR gates, each of which is a one-transistor logical element whose output is true if all of the inputs are false, and whose output is false if any one of the inputs is true. The inputs are coupled through individual resistors to the base electrode, and the output is taken from the collector electrode.

A relay driver is a circuit represented by a triangle having a line across it parallel to the base, with a single input to the base, and a contact adjacent to the apex. Each relay driver comprises a single transistor with the input connection to its base electrode, and a winding in the collector circuit which operates the single contact.

An inverter amplifier is a circuit similar to a NOR gate, except that it has only a single input. For convenience in the drawings, most of the logic gate circuits have been represented by AND gates and OR gates. In actual implementation an AND gate is achieved by using a NOR gate with each of the inputs inverted, and an OR is obtained by using a NOR followed by an inverter amplifier. It may be readily seen that in situations in which AND functions and OR functions appear alternately in tandem that NOR gates may be used with no inverters between them. A dot or small circle at an input or output designates an inversion or inhibit function.

In describing the logical operations performed by the gate circuits, Boolean algebra equations are used. In this notation the addition symbol signifies OR, the multiplication symbol, expressed or implied, signifies AND, and overlining signifies the inverted condition.

A test gate is a NOR gate designed to detect a negative input potential as a true condition and an open connection or ground as a false condition, while a regular NOR gate recognizes an open connection or negative potential as a true condition and ground potential as a false condition. A test gate is indicated in the drawings by a T within the gate symbol.

Referring to FIGS. 1 and 2, arranged as shown in FIG. 16, there is shown a symbolic diagram of a DSA (dial service assistance) trunk D111 connected through a three stage coordinate switching matrix 2, to a link L101 associated with an operator's position P1. The switching network is controlled by a marker 1A shown across the bottom of the two sheets comprising electronic scanners represented by a circle with a pointer therein, relay trees represented by open triangles or V's, and other components. In these figures the trunk, link, and position circuits have shown only the circuit apparatus associated with communication with the marker for network 2. The switching network 2 comprises three stages of coordinate arrays of crosspoint relays, each crosspoint relay having an operate or pull winding in series with a diode, a hold winding in series with one of its own contacts and five other contacts for respective conductors of a switched path. The interstage links have a P conductor series connecting the pull windings, a C conductor series connecting the hold windings, and five other switched conductors. Certain of the P conductors of the network are connected via relay trees to a trunk identifier in the marker, and the C leads of all of the interstage links are connected through relay trees to a path control scanner 211 in the marker.

When a call is received at the trunk D111 for extension to an operator position it closes a set of contacts to operate a gate relay G via ground received through a set of contacts in the marker. Relay G locks via a set of its own contacts, lead GLK, and a set of contacts to ground in the marker, Another set of contacts of the relay G extends a −16 volt potential which extends via a resistor and a set of contacts operated in the normal mode in the marker, via lead TNP, the G relay contacts, and another resistor to the lead PLA. Each call received at the trunk includes priority and class of call information for that particular call via apparatus not shown in FIG. 1. The priority indication opens a connection as represented by the break contacts between the lead PLA and one of the leads PR1′–PR5′ in accordance with the priority of the call, and also opens one of the leads between the lead PLA and one of the leads CL1′–CL5′ in accordance with the class of call. The marker via a priority scanner 101 connects ground to one of the five leads PR1′–PR5′ in accordance with the priority to be serviced, and also extends ground via a class scanner 102 to one of the leads CL1′–CL5′ in accordance with the class of call to be serviced. This effectively blanks the call-for-service potential on lead PLA at all trunk circuits except those of the priority and class then being serviced by the marker. The marker when operating in the normal mode for servicing calls originating at the trunks first opens the ground connection to lead G so that no additional trunks can operate their gate relays until all the trunks already calling for service (having their gate relays locked to ground on lead GLK) have been serviced. The priority and class scanners are operated to service all calls of each priority and class combination, one call at a time. Assuming that these scanners are at the position corresponding to the marked indication in trunk D111, the ground potentials from these two scanners is then disconnected from lead PLA. The −16 volt potential extends from lead PLA through the operate winding and series diodes of the A and B stages and appears at lead PBC101 extending to the AB group scanner 103 in the trunk identifier. The potential is also extended through an OR gate to a call-for-service conductor CFS.

The trunk identification arrangement including scanners 103, 104 and 105 is of the type covered by the Bruglemans patent, reference 4. The marker responds to the CFS signal to operate the AB group scanner 103 to find the calling potential on lead PBC101. This identifies one of five AB groups of the switching network. The output of the scanner 103 causes relay trees to operate to connect the P conductors of certain of the AB interstage link to an A card scanner 104 and also to connect the C conductors of the BC links associated with that AB group to the path control scanner 110. The marker then enables the A card scanner which detects the calling potential on lead PAB111, thereby identifying the particular A matrix. The output of the A card scanner operates relay trees to connect the PLA leads of that A matrix to the trunk scanner 105, and to connect the C conductors of the AB links of that A matrix to the path control scanner 110. The trunk scanner 105 is then operated to identify the calling potential appearing on lead PLA111 to thereby complete the identification of trunk D111. The output of the trunk scanner 105 in conjunction of the A card scanner 104 operates a relay tree to connect lead TP111 from trunk D111 to a polar relay TCK in preparation for eventually establishing the connection in the network.

To find an idle position circuit and link, the marker in the normal mode extends −16 volt potential via a resistor and a set of contacts to lead NPITP connected in multiple to all of the position circuits and thence via a resistor to a position test conductor PT. Each position includes an arrangement for indicating that it serves certain classes of calls as first choice, other classes as second choice, and other classes as third choice. There are fifteen conductors connected in multiple to all of the positions for the class-choice combinations, the first choice conductors being CHA1–CHA5, the second choice conductors being CHB1–CHB5, and the third choice conductors being CHC1–CHC5. At each position class-choice combination the circuit between lead PT and the corresponding class-choice conductor is broken, as represented in FIG. 2 by break contacts in series with diodes in the individual leads. The choice scanner 212 in the marker connects ground to one of the fifteen conductors. Assuming that position P1 handles the class of call received at trunk D111 on a first choice basis and that the choice scanner 212 is at the corresponding position connecting ground to the corresponding one of the leads CHA1–CHA5, the −16 volt potential on lead PT extends through normally closed contacts to the position idle test conductor PIT1 to the position scanner 211. The marker operates this scanner to select the call at this position. The output of the scanner 211 operates relay trees for connecting leads from the link L101 and the other link circuits associated with this position; the link idle test lead LIT101 and the corresponding set of test leads from the other links associated with this position being connected to the path control scanner 110. When the link is idle −16 volt potential via a resistor in the marker and a link idle test potential lead LITP connected in multiple to all of the links extends to LIT101.

Coincidence gating means associated with the path control scanner 110 now has available information combined from the C leads of the AB links and the BC links and the LIT test leads of the position links. The marker causes the path control scanner 110 to operate to select an available path. The output of the path control unit in combination with the output of the position scanner 211 now operates a relay tree to connect the lead LP101 to a polar relay LCK. The marker completes a ground connection to the two polar relays TCK and LCK to operate the connect relays TCN and LCN in the DSA trunk and link respectively. An operate path now extends from the negative exchange battery potential through a resistor and a set of contacts in the marker to lead TPH, through contacts of relay TCN to lead PLA, thence in series through the pull windings of the A, B, and C stage crosspoints of the selected path, via contacts of relay LCN to lead LPH and then via a set of contacts in the marker to ground, thereby operating the three stages of the matrix in series. The path is held via the hold windings of the three crosspoints in series with a cutoff relay in trunk D111 to exchange battery and ground via a cutoff relay CO in the link L101. The marker is then released to serve another call.

The marker is also arranged to service calls originating by the operators at the positions, using a sequence of operation substantially the same as that used for servicing calls from the trunks. When operating in the switchboard mode the −16 volt potential at the lead TNP to the trunks and at the lead NPITP to the positions is disconnected, and instead the potential is connected to lead TMP to the trunks and to lead CPITP to the positions. The principle is to mark all of the idle trunks to make them appear as though they were calling for service, and to mark the position circuits which are calling for service as though they were idle and available for connections. Note that in the trunk circuit D111, if it is calling for service or if it is busy and therefore has the cutoff slave relay COS operated, this negative potential is disconnected from lead PLA. Also if the trunk is busy it has ground potential via contacts of the cutoff relay CO connected to lead PLA.

The operator initiates a call by operating a key to operate a relay 2CFS which then locks by its own contacts and completes a ground connection to operate a gate relay PGT via ground on lead GP from the marker, the gate relay locking via its upper winding. The call for service is indicated to the marker via contacts of the gate relay PGT to complete a connection from −16 volts on the common conductor PCFSP to common conductor PCFS which produces a signal on lead SCFS in the marker.

The priority scanner 101, class scanner 102, and choice scanner 212 are not used in the switchboard mode.

The marker now proceeds in substantially the same sequence as described in a call for the normal mode. The trunk identifier operates its three scanners to select a trunk having the negative potential on its lead PLA. The position scanner 211 scans for a calling position, which has extended the negative potential from the marker via lead CPITP and resistor and contacts of the gate relay PGT in series with normally closed busy contacts to lead PIT1 and the scanner 211.

The path control scanner 110 now selects an idle path in the same manner as in the normal mode; and the connection is completed also in the same manner as in the normal mode. The marker is subsequently released to service other calls.

Figure 3:
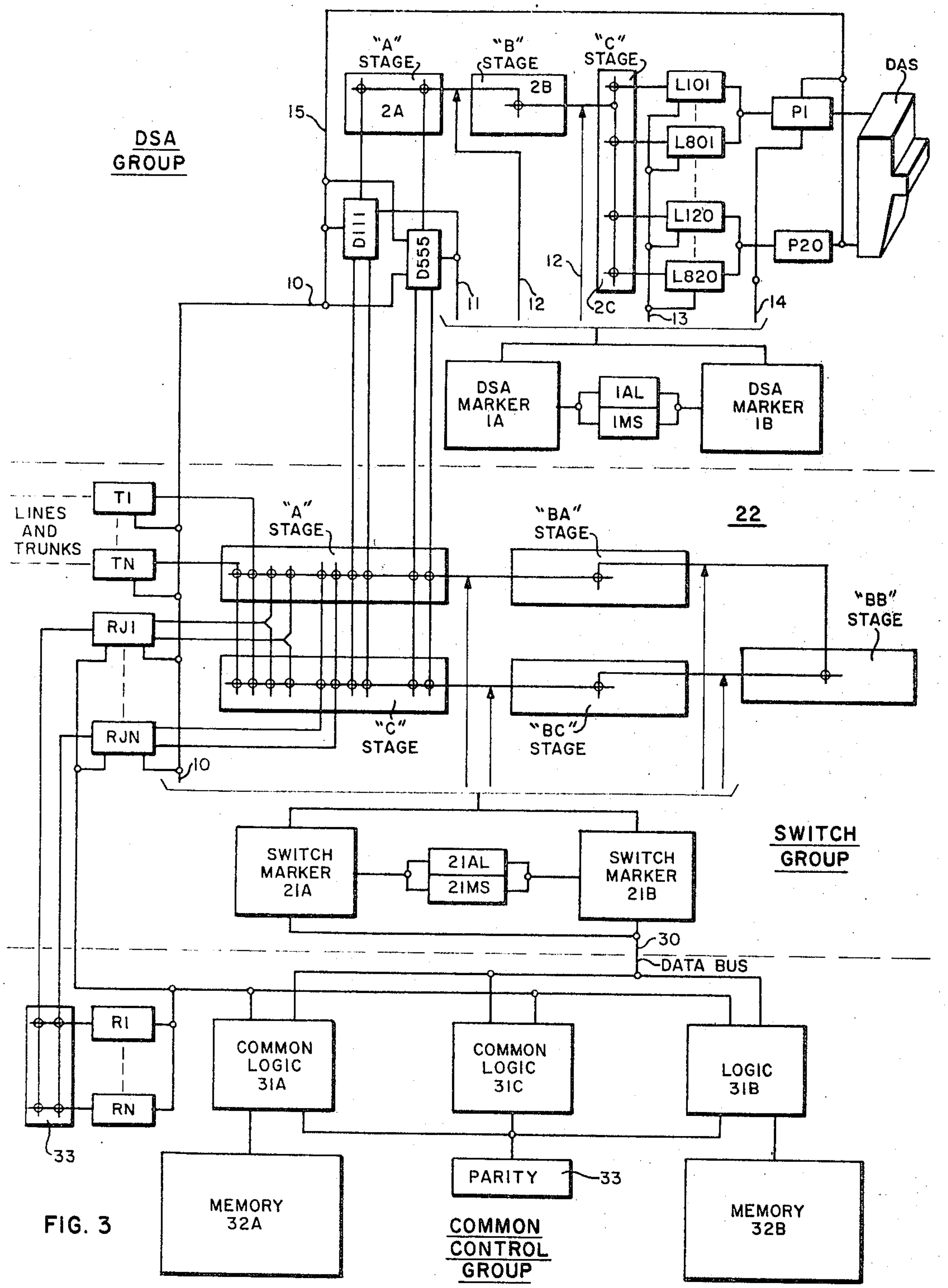
FIG. 3 is a block diagram of a system incorporating the arrangement of FIGS. 1 and 2.

FIG. 3 is a block diagram of the principal portions of a complete exchange. The *DSA* (*dial service assistance*) *group* at the top of the figure corresponds to the arrangement shown symbolically in FIGS. 1 and 2. The exchange also includes a *switch group* shown in the center of the figure, and a *common control group* shown at the bottom of the figure. The switch group comprises a five stage network 22 for connecting together any two of a plurality of terminals. These terminals include a plurality of line and trunk circuits T1–TN of various types, a plurality of register junctor circuits RJ1–RJN, and the dial service assistance trunks D111–D555. Each of the terminal circuits T1–TN has one network terminal connection having two appearances, one at the A stage and one at the C stage. Each of the register junctor circuits has two network terminals one for receiving and one for sending, each likewise having both an A appearance and a C appearance. Each of the DSA trunks D111–D555 has two switch group network terminals, one for front connections and one for rear connections, each of these terminals having likewise both an A appearance and a C appearance at the network 22. Each of the DSA trunks D111–D555 also has one terminal appearance at the A stage 2A of the DSA group switching network 2. In addition to the A and C stages, the network 22 includes a BA stage, a BB stage and a BC stage, the entire network being a nonblocking configuration. Connections through network 22 are controlled by one of the two markers 21A and 21B, these markers being alternately on-line. An allotter 21AL and a maintenance section 21MS is common to the two switch markers 21A and 21B.

The common control group includes three common logic units 31A, 31B, and 31C, each of which receives and processes all call information simultaneously. A parity circuit 33 includes comparison apparatus for determining whether all three of the common logic units are in agreement, and for causing appropriate operating and maintenance action to be taken if they are not in agreement. Memories 32A and 32B are associated respectively with the common logic units 31A and 31B. Output information is taken only from one of the common logic units 31A or 31B at any one time. The common control group also includes a coordinate switching matrix 33 for connecting any one of the register junctors to any one of a plurality of receivers or transceivers R1–RN. These units individually are arranged for interchange multifrequency receiving and sending or for subscriber touch calling multifrequency signaling. Dial pulse signaling is detected in the register junctor in which case no connection via matrix 33 is required. Each of the switch terminations also has a connection, not shown, to the common control for busy indication.

In the DSA group the dial assistance switchboard DAS has twenty positions P1–P20, and each position has eight links, those associated with position P1 being designated L101–L801 and those associated with position 20 being designated L120–L820. Each link may be connected via the network 2 having the three stages, 2A, 2B and 2C to any one of the DSA trunks D111–D555. The connections through the network 2 are controlled via the DSA markers 1A and 1B which are alternately on line. Common to the two markers there is an allotter 1AL and a maintenance section 1MS. Only one of the two markers is on line at any one time.

Assume now that a call is received at terminal circuit T1 from a subscriber line to be completed to an operator. All of the terminal circuits of the switch group are connected in multiple via a multiconductor group 10 to the two switch markers 21A and 21B, and P and C conductors of the interstage links are also connected to the marker in a manner similar to those in the DSA marker 1A. Assuming that marker 21A is on line, the call is detected and identified via conductors in group 10. The information is forwarded from the marker via a multiconductor data bus 30 to the common logic units of the common control group. The common control then selects an idle register junctor such as RJ1 and via the data bus conductors 30 supply the terminal information for terminals T1 and the receiving terminal of RJ1 to the marker 21A. The marker then selects and establishes an idle path between these two terminalsl through the five stages of network 22 and releases. The common control group connects the junctor RJ1 via matrix 33 to a local subscriber touch calling receiver such as R1. The subscriber then transmits signals which are transmitted from the terminal T1 through the network 22 and the junctor RJ1 to the receiver R1. These signals include a designation of the priority and an operator class of call. The common logic then selects a DSA trunk such as D111, obtains the service of a marker 21A and via conductors of the data bus 30 supplies the designations of the terminals T1 and one of the terminals of trunk D111 along with the priority and class information for the call which is stored in the marker 21A. The marker then selects and establishes a connection through the network 22 from terminal T1 to the terminal of trunk D111, and also via conductors of the group 10 supplies the priority and class information to operate relays in the trunk D111.

The trunk D111 now calls for the service of a DSA marker which is on line, which we will assume to be marker 1A. The connection is then completed in the manner already described with reference to FIGS. 1 and 2.

Figure 4:
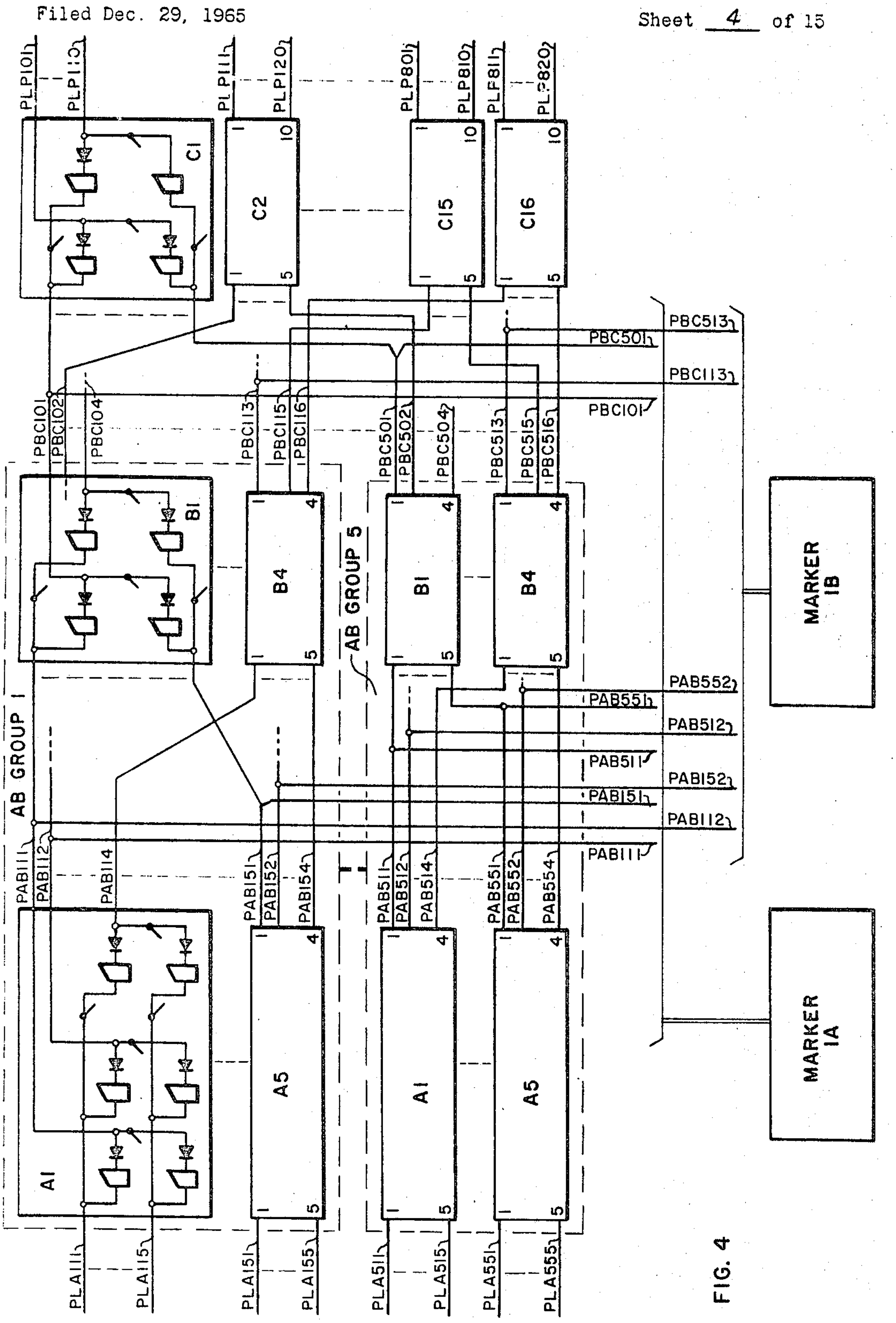
FIG. 4 is a diagram of the switching network used in the arrangement of FIGS. 1 and 2 showing particularly the pull conductors and operate windings of the crosspoint relays.

Since the call for service and trunk identification arrangement between the DSA trunks and the markers 1A and 1B makes use of the switching network 2, using diodes in series with the pull windings to prevent sneak paths via reverse direction of current flow, it is possible to provide separate paths using a completely separate set of diodes for the connections to the two markers 1A and 1B. The arrangement of the coordinate matrices in the switching network 2 is shown in FIG. 4. This figure shows only the pull windings and P conductors, but it is readily apparent that the other six conductors are always associated therewith as shown in FIG. 1.

The network arrangement shown in FIG. 4 serves a maximum of one hundred twenty-five DSA trunks and twenty positions, each position having twenty links. There are five AB groups designated AB group 1–AB group 5. Each AB group has five (5×4) A matrices and four (5×4) B matrices. Thus each AB group has twenty-five inlets and sixteen outlets. Within each AB group each A matrix has a link connecting it to each B matrix. These links are designated by a three digit number designating respectively the AB group, the A matrix in the group, and the B matrix in the group. There are sixteen (5×10) C matrices, each AB group having a link connected to each C matrix. The BC links have a three digit designation, the first digit designating the AB group, and the last two digits designating the C matrix. Likewise the output of the C matrices have three digit designations, the first digit designating one of the eight links of a position, and the last two digits designating the position. The C matrices are in pairs with the first matrix of each pair serving positions 1 to 10 and the second serving positions 11 to 20. Thus the P leads from the outputs of the first pair of matrices C1 and C2 are designated PLP101–PLP120 and those from the last pair C15 and C16 are designated PLP801–PLP820. At the input side of the network the terminals have three digit designations, designating respectively the AB group, the A matrix within the group, and the input of the A matrix. Thus the P leads at the terminals of the first A card of the first A group are designated PLA111–PLA115, and those of the last matrix of the last group are designated PLA551–PLA555 for a total of 125 input terminals.

For call-for-service and AB group identification each marker requires a connection to one P lead of a BC link of each AB group. Therefore marker 1A is connected via the five BC–link P leads, PBC101, PBC201, PBC301, PBC401 and PBC501; these being the P leads to the first outlet of the first B matrix of each AB group. The connections to the marker 1B use the first outlet of the matrix B4 of each AB group, namely the five P leads, PBC113–PBC513.

For the inputs to the A card scanner each marker requires a P lead connection to one link of each A matrix of each group. Therefore marker 1A uses the connection to the P lead of the first output of each A matrix, and marker 1B uses the P lead of the second outlet of each A matrix. Thus marker 1A is connected via the twenty-five AB link P leads PAB111, PAB121–PAB151; PAB211, PAB221–PAB251 etc. up to PAB511–PAB551. Similarly marker 1B is connected via the twenty-five AB link P leads PAB112, PAB122–PAB152 etc. up to PAB512–PAB552. It will be readily apparent in tracing the connections from the PLA conductors of the trunks through the network to the P lead connections to the markers that marker 1A uses a completely separate set of diodes from those used by marker 1B. Thus a shorted or open diode in a network can cause trouble in only one marker, and the maintenance apparatus can be designed to readily detect the source of trouble. The parity check arrangement of FIG. 15 aids in the trouble detection.

DSA TRUNK (FIGS. 5, 6 AND 7)

Figure 5:
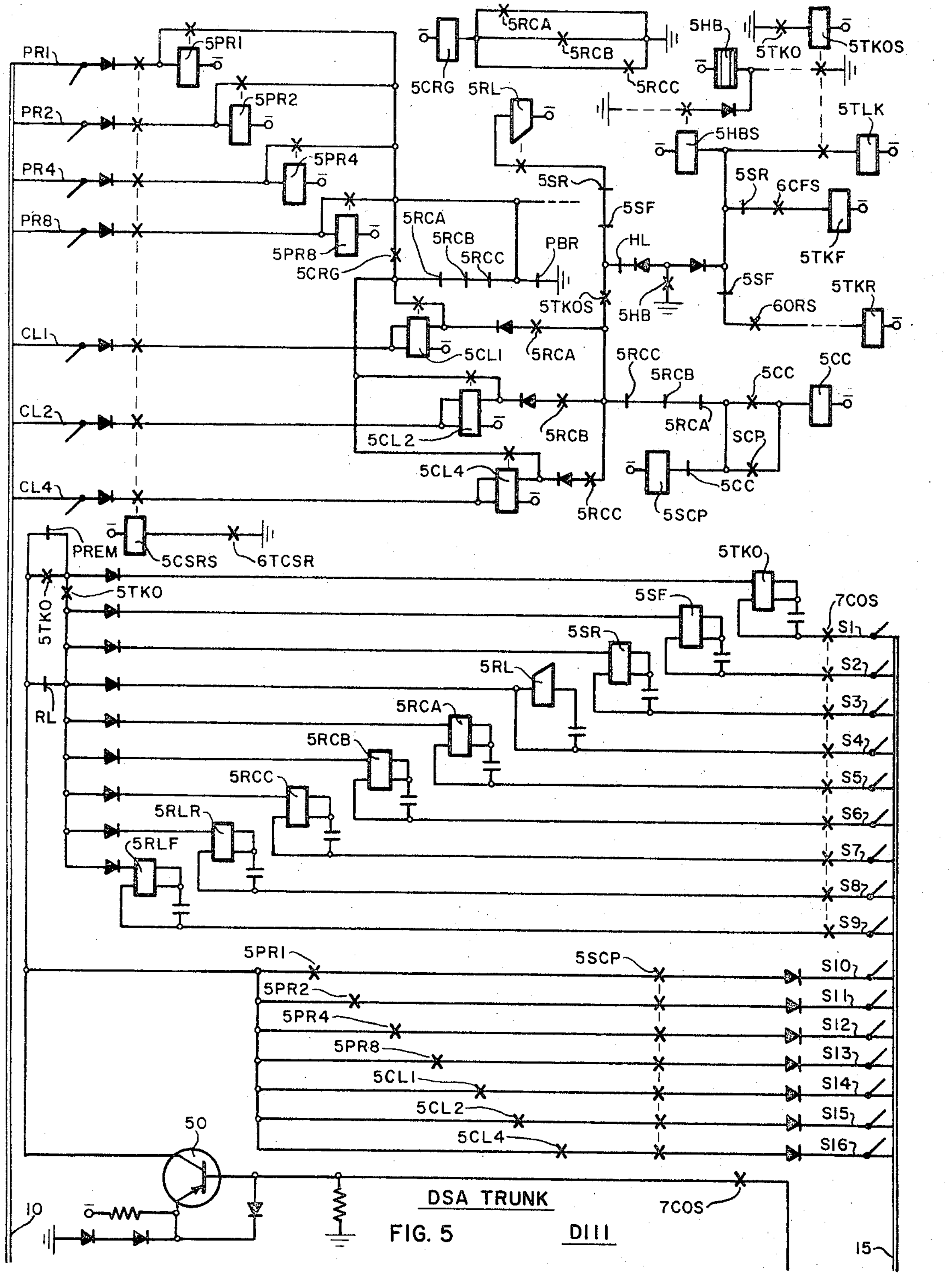
Figure 6:
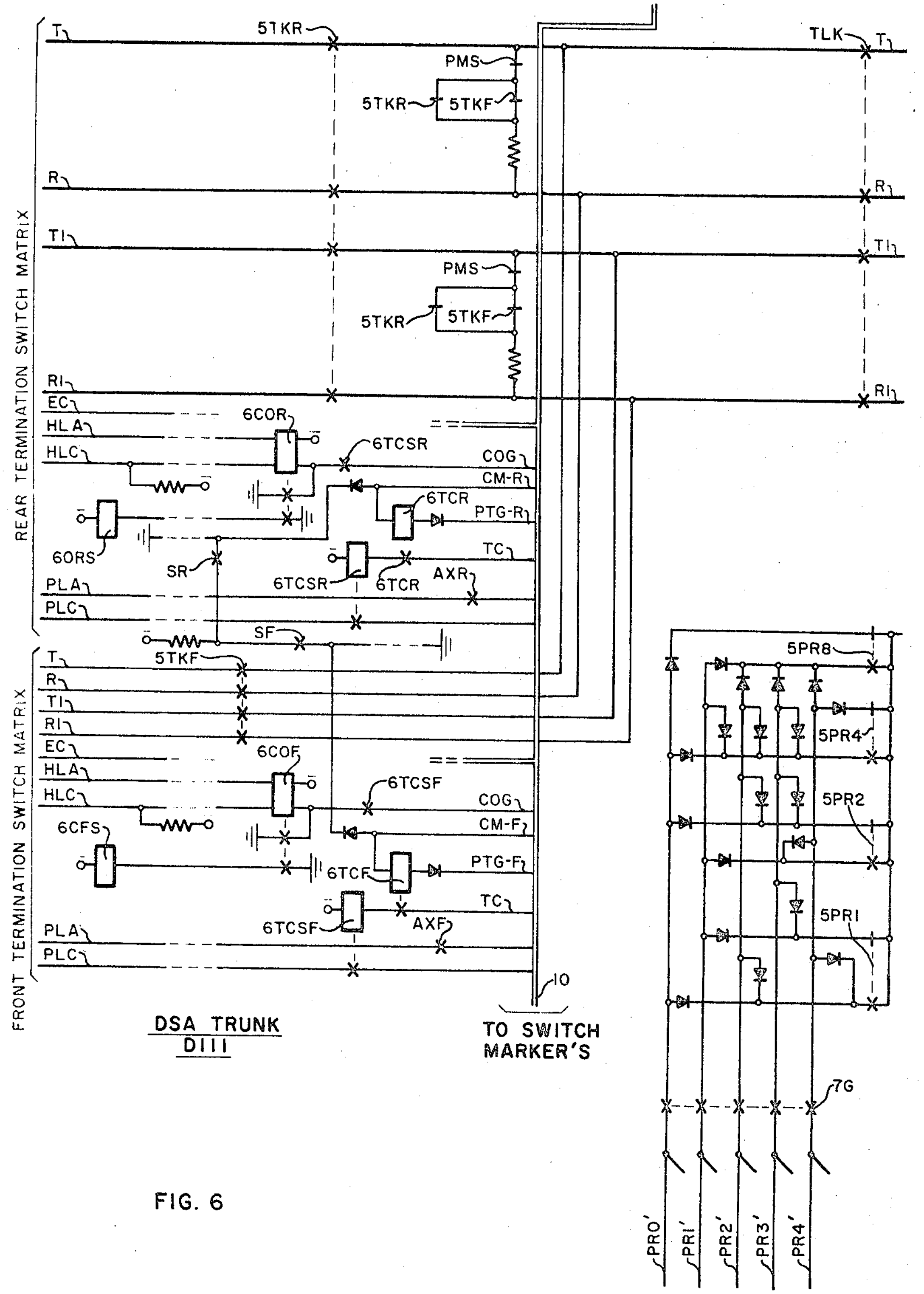
Figure 7:
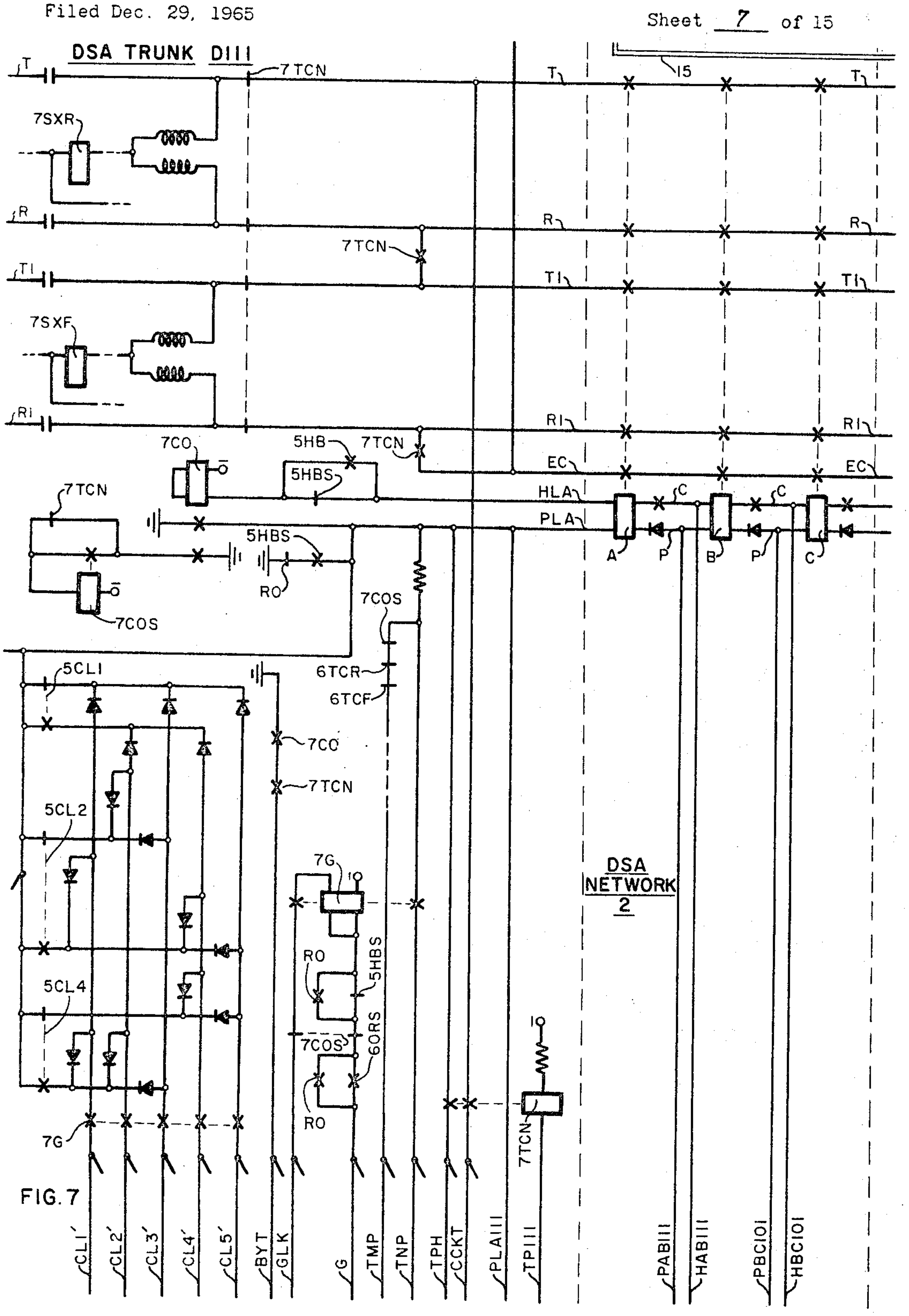

The DSA trunk D111 is shown in FIGS. 5, 6 and the left portion of FIG. 7. Only a portion of the apparatus of the trunk is shown sufficient to explain the general operation. Some of the relays have only contact sets shown, in which case the reference character does not have a figure number prefix.

Figure 10:
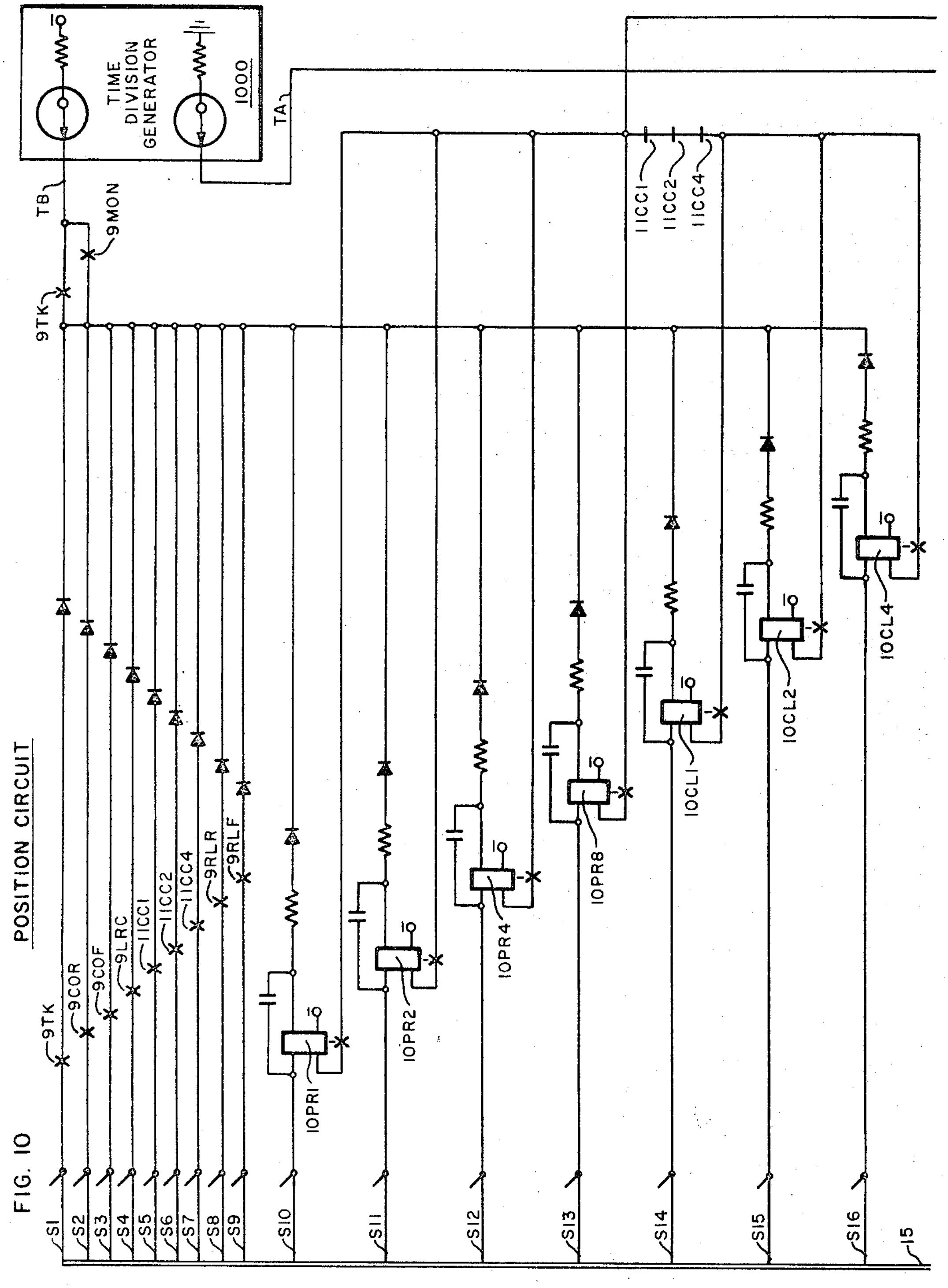
Figure 11:
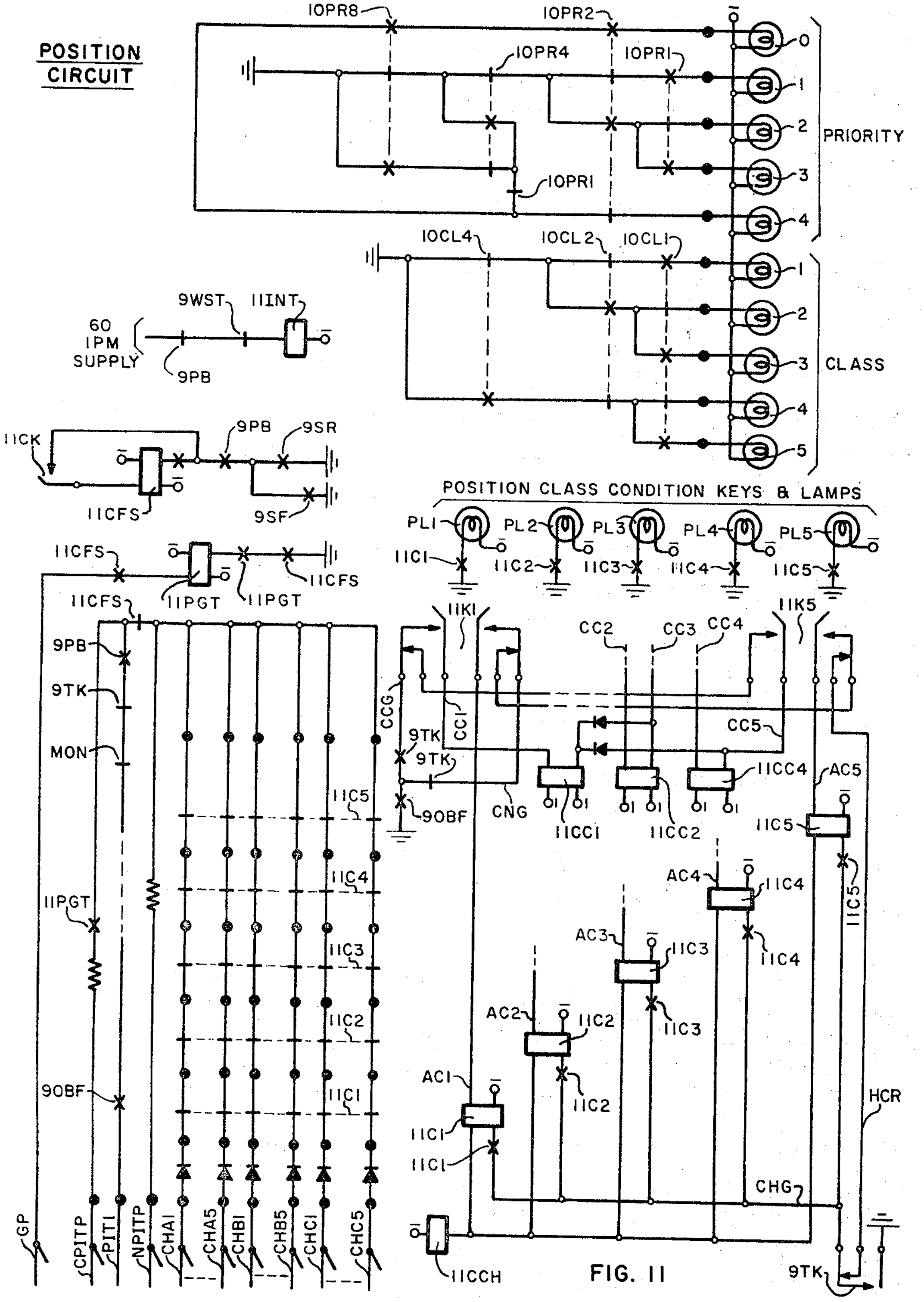

The trunk has three network terminations, two of these shown at the left side of FIG. 6 being the front and rear terminations of the switch network 22, and one shown at the top of FIG. 7 to the DSA network 2. There is also provision for time division signaling via the conductors S1–S16 of conductor group 15 connected in multiple between all of the DSA trunk circuits as shown in FIG. 5 and all of the position circuits as shown in FIG. 10. The switch network terminations are substantially the same as those of the other switch network terminations as disclosed in references 2 and 3.

An incoming call is received via the rear termination. The switch marker grounds the lead CM–R and places resistance battery on the lead PTG–R to operate relay 6TCR. The operation of relay 6TCR connects several conductors only part of which are shown in FIG. 6 via conductor group 10 to the switch marker. The marker places ground on lead TC to operate relay 6TCSR. The operation of relay 6TCSR connects additional ones of the conductors via conductor group 10 to the switch marker and operates relay 5CSRS to connect the leads PR1, PR2, PR4, PR8, CL1, CL2 and CL4. The switch marker forwards priority and class information via these conductors as ground signals which operate the corresponding ones of the relays 5PR1–5PR8 and 5CL1–5CL4. These relays then lock to store the information in the trunk circuit. The switch marker causes the connection through the switch network to the rear termination to be completed and it is then released. The cutoff relay 6COR is now operated in the holding path of the connection, and operates relay 6ORS. Contacts of relay 6ORS complete a connection from lead G from the DSA markers to the winding of relay 7G.

When the DSA marker is ready to accept calls it grounds lead G thereby operating relay 7G. Relay 7G locks to lead GLK, connects lead TNP via a resistor to lead PLA, and connects the priority and class diode tree to the five priority leads PR0′–PR4′ and five class leads CL1′–CL5′ to the DSA marker. The priority relays disconnect one of the priority conductors, and the class relays disconnect one of the class conductors from the lead PLA in accordance with the code combination of the relays, namely for no priority relays 5PR2 and 5PR8 operate to disconnect lead PR0′, for priorities 1, 2 or 4 the corresponding one of the relays 5PR1, 5PR2 or 5PR4 operates to disconnect the corresponding one of the leads PR1′, PR2′ or PR4′. For priority 3 relays 5PR1 and 5PR2 operate to disconnect lead PR3′. For class of call information, operation of one of the relays 5CL1, 5CL2 or 5CL4 opens the connection to the corresponding one of the leads CL1′, CL2′ or CL4′; operation of relays 5CL1 and 5CL2 opens the connection to lead CL3′, and operation of relays 5CL1 and 5CL4 opens the connection to lead CL5′. The marker grounds one of the 5 leads PR0′–PR4′ and one of the class leads CL1′–CL5′ to thereby place ground on lead PLA for all calling DSA trunk circuits except those having their priority and class relays operated to indicate the priority and class then being serviced by the marker.

A negative potential on lead TNP via the contacts of relay 7G on lead PLA causes a call for service signal to be extended through the DSA network 2 to lead PBC101 to inform the DSA marker of the call for service. The DSA marker then identifies the calling trunk via the negative potential on leads PBC101, PAB111 and PLA111. To complete the connection through the DSA network 2 the marker grounds lead TP111 to operate the connect relay 7TCN. The marker subsequently places —50 volt potential on lead TPH which extends through the contacts of relay 7TCN to lead PLA to operate the selected path through the DSA network 2. A continuity check is made from lead CCKT through contacts of relay 7TCN to conductor T and also shorting together leads R and T1, and R1 and EC to make the continuity check through the network. Relay 7CO operates in the hold path of the network. The DSA marker releases, and relay 7COS operates connecting the leads S1–S9 of the time division signaling group 15. The DSA operator is summoned by a flashing lamp in the associated link. The operator answers by operating the appropriate talk key. Time division signals via the lead EC through the network and transistor 50 operate relay 5TKO via conductor S1. The operation of 5TKO operates relay 5TKOS. Relay 5TKOS operates relay HB and also relay 7SXF via a path not shown. The operation of relay 5HB operates relays 5TLK, 5TKR, 5HBS, and 5SCP. The operation of relays 5TLK and 5TKR extends the transmission path to the operator. The operation of relay 5SCP extends the leads S10–S16 and closes relay 5CC. The time division class and priority signals are forwarded to the DSA position through the contacts of the operated class and priority relays and conductors S10–S16. After its slow-to-operate interval, relay 5CC operates, locks, and releases relay 5SCP.

To extend the call the operator operates the key in the position circuit which operates the relay 5SF via time division signals. The operation of relay 5SF releases relay 5TKR to cut off the calling party, and connects negative battery potential to lead CM–F to provide a call for service signal to the switch marker via conductor group 10. The switch marker then provides a connection from the front termination through the switch network 22 to a register junctor, in the same manner as described for the connection to the rear termination. When the register is ready to accept information, relay 7SXF is used to extend a simplex signal via the network 2 to light a send pilot lamp. The operator keys in the called number with the first digit being the priority and restores the send front cutoff rear key, but does not restore the talk key. When the send front cutoff rear key is restored the time division signal is removed from lead S2 restoring relay 5SF, which operates relay 5TKR. The register processes the call and then drops the register-DSA trunk connection and establishes a second and final path from the front termination to a switch network terminal.

The operator can change the calling (rear) party's class by keying in a new class to operate various combination of relays 5RCA, 5RCB and 5RCC by time division signals over leads S4, S5 and S6. The operation of one or more of these relays releases the holding ground of the previously operated class relays, releases relay 5CC, and operates relay 5CRG. After its slow-to-operate interval, relay 5CRG operates and connects a holding ground to the class correeds. When the class keys are restored at the position, the relays 5RCA, 5RCB, and/or 5RCC restore, release relay 5CRG, and operate relay 5SCP. Relay 5SCP extends leads S10 to S16 to provide a display of the new class, and operates relay 5CC. After its slow-to-operate interval, relay 5CC operates and releases relay 5SCP.

After receiving the off hook signal, the operator may disconnect without releasing the link by restoring the associated talk key. This removes the time division signal from lead EC to cut off transistor 50. This releases relay 5TKO, which in turn releases relay 5TKOS. Relay 5TKOS restores and releases relays 5CC and 5TLK. Since the link has not been released, the operator retains complete front and rear supervision. The operator may also reenter the transmission facility by operating the associated talk or monitor key to operate relays 5TKO, 5TKOS, and 5TLK. Relays 5SCP and 5PC repeat the class and priority cycle.

If the operator desires to release the link upon retiring from the call, the link release key is operated at the associated position. A time division signal via lead S4 operates relay 5RL which locks at its second winding. The operator then restores the associated talk key cutting off transistor 50 and releasing relays 5TKO and 5TKOS, and also releasing the matrix connection. The release of relays 5TKOS releases relays 5TLK and 5CC. The release of the matrix connection releases relays 7CO and 7COS. Relays 7SXR and 7SXF are operated, thus maintaining the off hook supervision to the calling and the called party. When the operator disconnects in this manner, the circuit cannot be reaccessed by operating the associated talk or monitor key. The associated link has been released and is free to handle subsequent calls. The operator can cancel the link release operation by momentarily operating the send front or send rear key. Relays 5SF or 5SR momentarily operate opening the locking winding of relay 5RL.

LINK CIRCUIT (FIG. 8)

Figure 8:
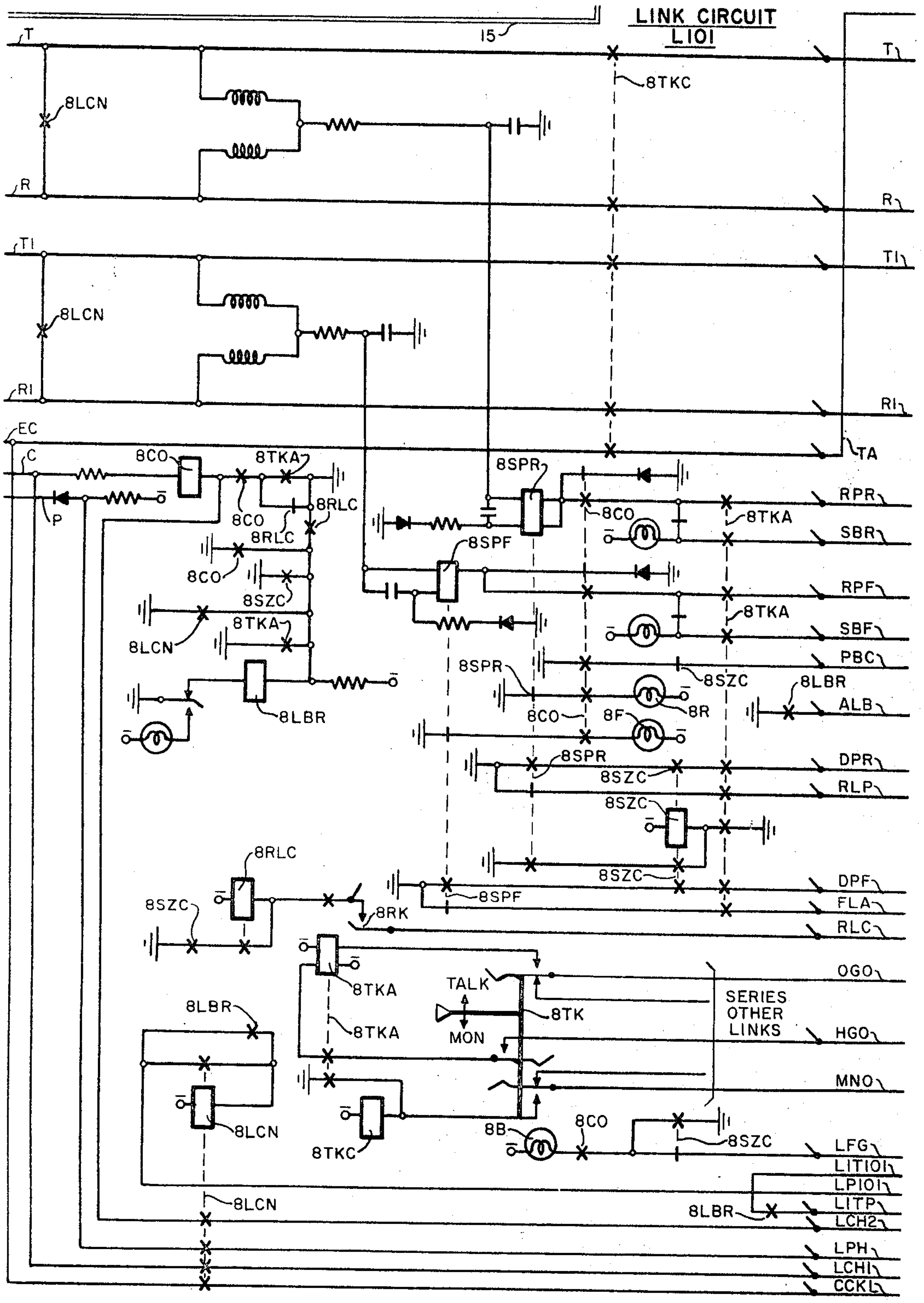

One of the eight links associated with position P1 is shown in FIG. 8. Each link has the following controls and supervisory lamps at the operator position: link busy lamp 8B, rear supervisory lamp 8R, front supervisory lamp 8F, trunk and monitor key 8TK, and link release key 8RK. Since all eight link talk keys are connected in series, only one link can be accessed at a time.

Each link can be associated with the common position equipment for re-ring, sending, etc. Once a link is associated with a DSA trunk and the call extended, the operator can hold or release the link. The operator can monitor the call any time if the link is held, but if the link is released, the call cannot be monitored.

Signaling between the DSA link and the DSA trunk is accomplished via simplex derived circuit paths with differential relay circuits 8SPR and 8SPF in the link and relays 7SXR and 7SXF in the trunk to provide two way, on-off hook supervision front and rear.

The marker in the operation of setting up a call scans conductor LIT101 and finds the link idle, as indicated by the continuity of the connection between leads LITP and LIT101. The link busy relay 8LBR is normally operated when the link is idle. When the DSA marker selects the idle link, ground is forwarded via lead LP101 to operate the connect relay 8LCN. A continuity check is made through contacts of relay 8LCN connecting lead CCK1 to the EC conductor of the network connection and connecting together leads T and R and also leads T1 and R1 which in conjunction with a connection through contacts of relay 7TCN in the trunk completes a path to lead CCKT connecting the five network conductors in series. After the continuity has been verified, the ground shunt provided on conductor LCH1 by the DSA marker is removed and the link cutoff relay 8CO operates. Ground is then removed from lead LCH2. Operation of the cutoff relay 8CO causes the busy relay 8LBR to release, marking the link busy to the marker.

The operation of relay 8CO causes the link busy lamp 8B to flash at 60 i.p.m. and the link front and rear supervisory lamps 8F and 8R to light. Upon release of relay 8LCN, the off-hook signal forwarded by the DSA trunk causes the differential relay 8SPR to operate. The link rear supervisory lamp 8R is extinguished. The operator now has 60 i.p.m. flash of link busy lamp 8B, and off-hook indication and on-hook of the rear and front supervisory lamps 8R and 8F respectively.

The operator answers by operating the proper link talk key 8TK. Relay 8TKA operates and locks via resistance ground on lead HGO. Relay 8TKC also operates. The four transmission conductors and lead EC are connected through to the position. The operator then performs the functions necessary to complete the call at the position. When the called party answers, the DSA trunk forwards the off-hook signal operating relay 8SPF to extinguish the front supervisory lamp 8F.

If the operator wishes to disconnect, but still hold the link to maintain complete front and rear supervision, the link talk key 8TK is restored opening relays 8TKA and 8TKC. This disconnects the front and rear supervisory leads, and also the transmission conductors from the position. If the operator wishes to re-access the transmission facilities, the appropriate talk key 8TK is operated. If the operator wishes to monitor the conversation, the key 8TK is operated to the monitor position, operating relay 8TKC to connect the transmission conductors to the operator position.

The operator may retire from a DSA trunk and release the associated link, by first operating the link release key 8RK, and then restoring the talk key 8TK. The operator cannot access the DSA trunk once the link has been released. The front and rear transmission conductors are connected together in the DSA trunk. When the link release key 8RK is operated relay 8RLC operates and locks. Restoring the talk key 8TK causes relays BTKA, 8TKC, 8CO, 8SPR, 8SPF, 8SCZ, and 8RLC to release and 8LBR to operate. The operator can cancel the link release operation by momentarily operating the send front or send rear key before restoring the talk key. Once the link is released, it is idle and ready for another call.

OPERATOR'S POSITION CIRCUIT (FIGS. 9, 10 AND 11)

The DSA position circuit is used to perform certain functions in a DSA trunk via one of the eight DSA link circuits associated with the position control. The DSA position has the following control equipment: position class conditioning keys 11K1–11K5, key set circuits 900, position call for service key 11CK, ring front and ring rear key 9SG, cutoff front and rear key 9CO, send front and rear key 9S, and release front and rear key 9RL. The DSA position circuit provides an operator's coupling circuit 910 which includes amplifiers and resistors to couple the operator's telephone to a four-wire circuit between two parties. Time division signaling is used to signal between the position and the DSA trunk.

The operator must have the operator's telephone set comprising receiver 911 of the transmitter 912 connected to the position circuit to accept or initiate calls. Relay 9OBF operates when the position is staffed.

The operator must operate one of the position class conditioning keys 11K1–11K5 to accept calls. The DSA marker assigns calls to a position on a choice-class basis. Each position will accept certain classes of calls for first, second and third choice. There are five different class accepting conditions for each position. Each of the class accepting conditions is determined by a strapping option via strapping terminals and break contacts of the relays 11C1–11C5 in conductors connected through respective diodes to the fifteen conductors CHA1–CHC5. Relays 11C1–11C5 are class conditioning relays, one associated with each condition. The operator can select the desired condition by operating the respective class conditioning key. The operator lamps PL1–PL5 indicate the class acceptance condition of the position. The class condition can be changed by the operator, when the link talk keys are not operated, by momentarily operating another class conditioning key.

By way of example, the class assignment may be:

Class 1—Assistance
Class 2—Inward
Class 3—Information and intercept
Class 4—Conference
Class 5—Record In extending a call to a position, the DSA marker first checks lead PIT1 for idle indication. If an idle position is available, the marker grounds the appropriate choice 1 lead CHA1–CHA5 to determine if the position can accept the incoming class of call. Each position has designated, by the operation of a class conditioning relay 11C1–11C5, which class of call is to be accepted for choice 1, choice 2, and choice 3. If none of the positions can accept the call as first choice, the marker checks which position can handle the call as a second choice. If at the end of the third choice, no position can handle the call, the marker returns to choice 1 and repeats the cycle.

When a link is connected to a position, the operator receives a locally generated acceptance tone (not shown). Relay 9PB restores. Relays not shown operate to provide the tone. The operator also receives a 60 i.p.m. flash on the respective link supervisory lamp indicating a call is waiting. This signal is extended by the link circuit. Relay 11INT operates at 60 i.p.m. to provide the 60 i.p.m. flashing ground.

The operator answers the call by operating the respective link talk key. Relay 9TK and relay 9PB operate. Relay 11INT and the tone relays restore. The class relays 10CL1–10CL4, and priority relays 10PR1–10PR8, which indicate the class and priority of the incoming call on associated lamps (FIG. 11), operate via time division signals from the associated trunk. Each time the operator enters a link by operating the talk key, the class and priority information is displayed.

The operator operates the send key 9S to the send forward position operating relays 9COR and 9SF in series. The time division signaling arrangement includes a time division generator 1000 represented symbolically by two scanners which operate in synchronism to connect battery to lead TB and ground to lead TA. Lead TA is extended via the EC lead of the transmission path through the link and DSA network. Lead TB is connected via contacts of relay 9TK or 9MON to the TDM signaling arrangement.

The operation of relay 9COR connects the time division negative potential to lead S2 to cause the DSA trunk to cut off transmission to the rear (calling) party.

After a register is connected to the front access of the DSA trunk, the register returns a 100-millisecond start dial signal which is repeated to the position via lead DPF from the link circuit to the position circuit. Relay 9WST operates a set of make contacts at the start of the start dial signal and short circuits its upper winding. At the end of the start dial signal ground is removed from lead DPF. Relay 9WST operates fully and lights the send pilot lamp 9SP.

The operator keys the desired number using the key set circuit 90. A priority signal is keyed-in followed by the desired number. After keying has been completed, the send key 9S is restored. Relay 9COR, relay 9SF, and 9WST restore. The operator may wait to verify the called party answer, or the link talk key may be restored before answered. The link front and rear lamp supervisory is maintained in either case.

When the link talk key is restored, relays 9TK and the class and priority indicating relays 10CL1–10CL4 and 10PR1–10PR8 release. If the operator operates the link release key, relay 9LRC operates momentarily.

The operator can condition the position to accept certain class calls on a choice basis. With the link talk key not operated, the operator can change the class condition by momentarily operating the desired one of the five class conditioning keys 11C1–11C5. Each class conditioning key has an associated lamp PL1–PL5 to indicate the condition under which the position is operating. Assume the class condition is to be changed from class 2 to class 4. Key 11C4 is operated momentarily. Ground is momentarily removed from the conductor CHG releasing relay 11C2 which extinguishes lamp PL2, and closing relay 11C4 in series with relay 11CCH. The operation of relay 11CCH grounds lead LCS. When key 11K4 is restored, relay 11CCH restores and relay 11C4 locks to ground on lead CHG.

The operator can change the class of a call by changing the storage in the DSA trunk. To change the storage in the trunk the link talk key must be operated, which causes relay 9TK to operate. The position class conditioning keys 11K1–11K5 are used. If the operator wishes to change the class of a call from class 3 to class 5 key 11K5 is operated momentarily, operating relays 11CC1 and 11CC4, and time division negative potential from lead TB is connected to leads S5 and S7 to store the new class in the DSA trunk. When key 11K5 is restored, relays 11CC1 and 11CC4 restore. The DSA trunk returns the new stored information operating the class lamps (FIG. 11) to provide a display of the new class information.

Figure 9:
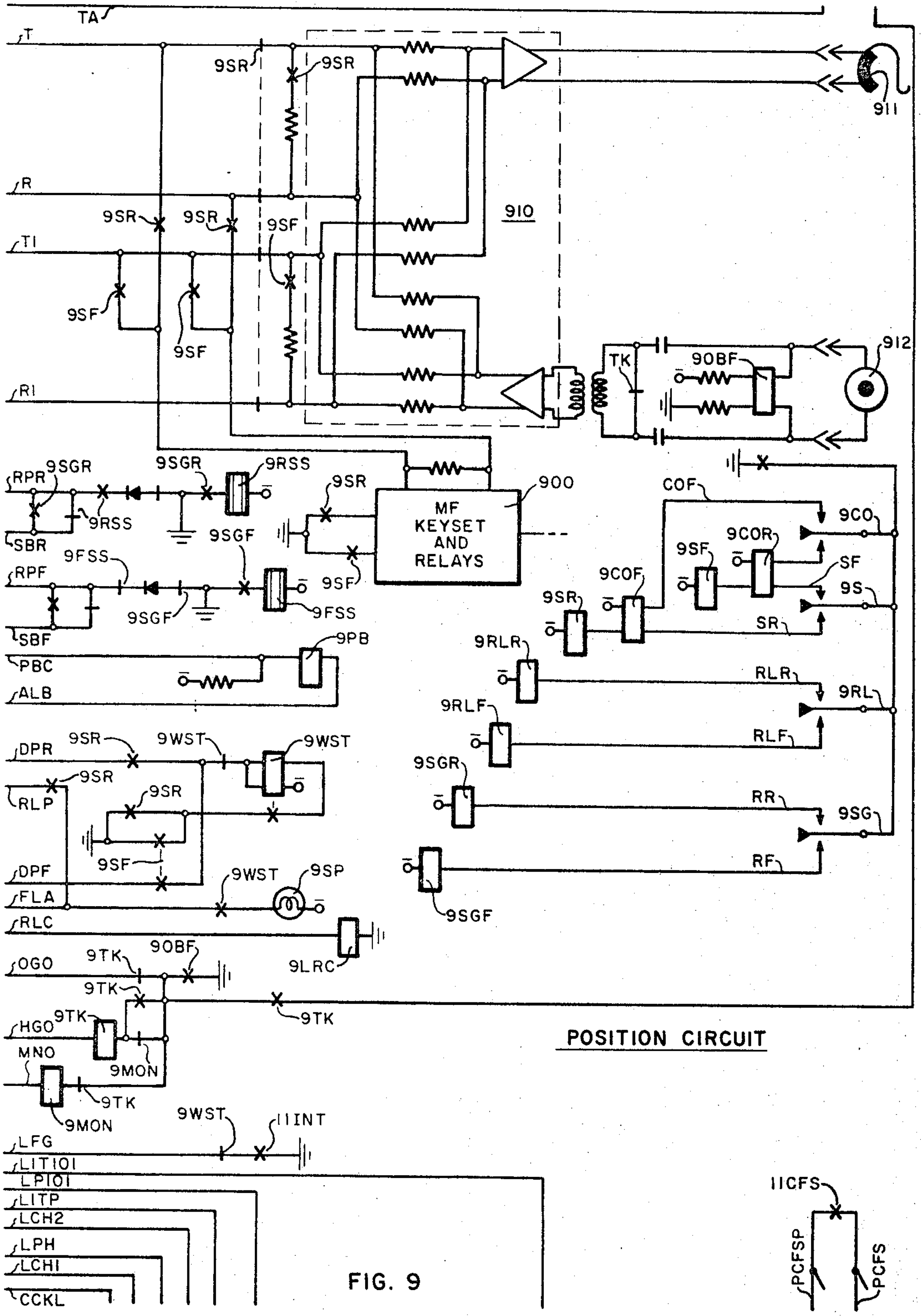

The operator may also initiate a call by operating the send key 9S to the send front position operating relays 9SF and 9COR. The call for service key 11CK is momentarily operated closing relay 11CFS, which operates, locks, and initiates a call for service by connecting leads PCFSP and PCFS (FIG. 9). When the marker opens the gate to accept calls, ground via lead GP operates relay 11PGT. The relay locks and connects leads PIT1 and CPITP via a resistor to provide an indication to the marker that this position is requesting service. After identifying the position requesting service, the marker selects an idle link associated with this position and connects the link to a DSA trunk. When checks and vertifications are completed, the DSA marker releases.

The operator operates the link talk key. Relay 9TK and 9PB operate. The operation of relay 9PB releases relay 11INT. The operator then extends the call.

MARKER (FIGS. 12, 13 AND 14)

Figure 12:
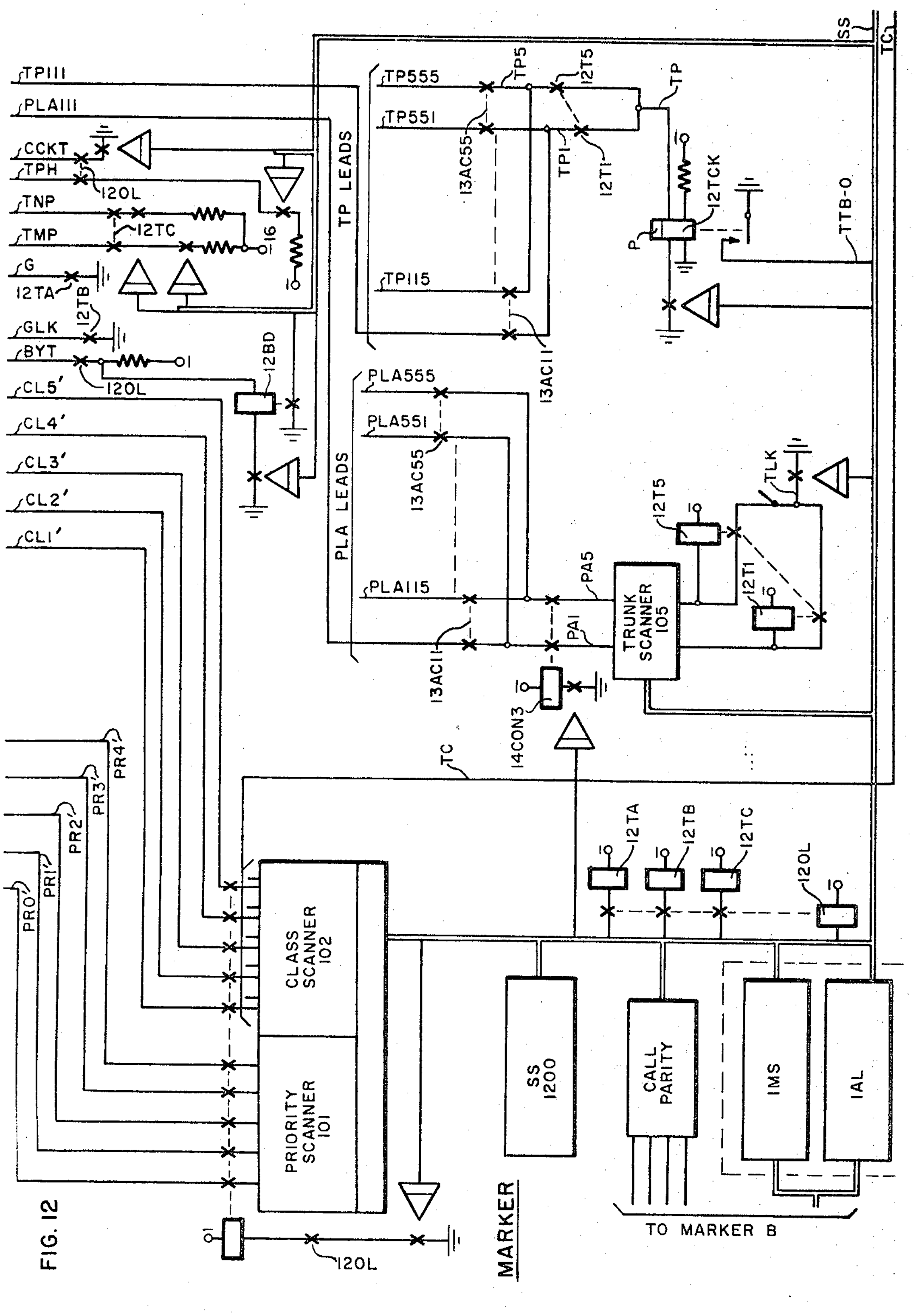
Figure 13:
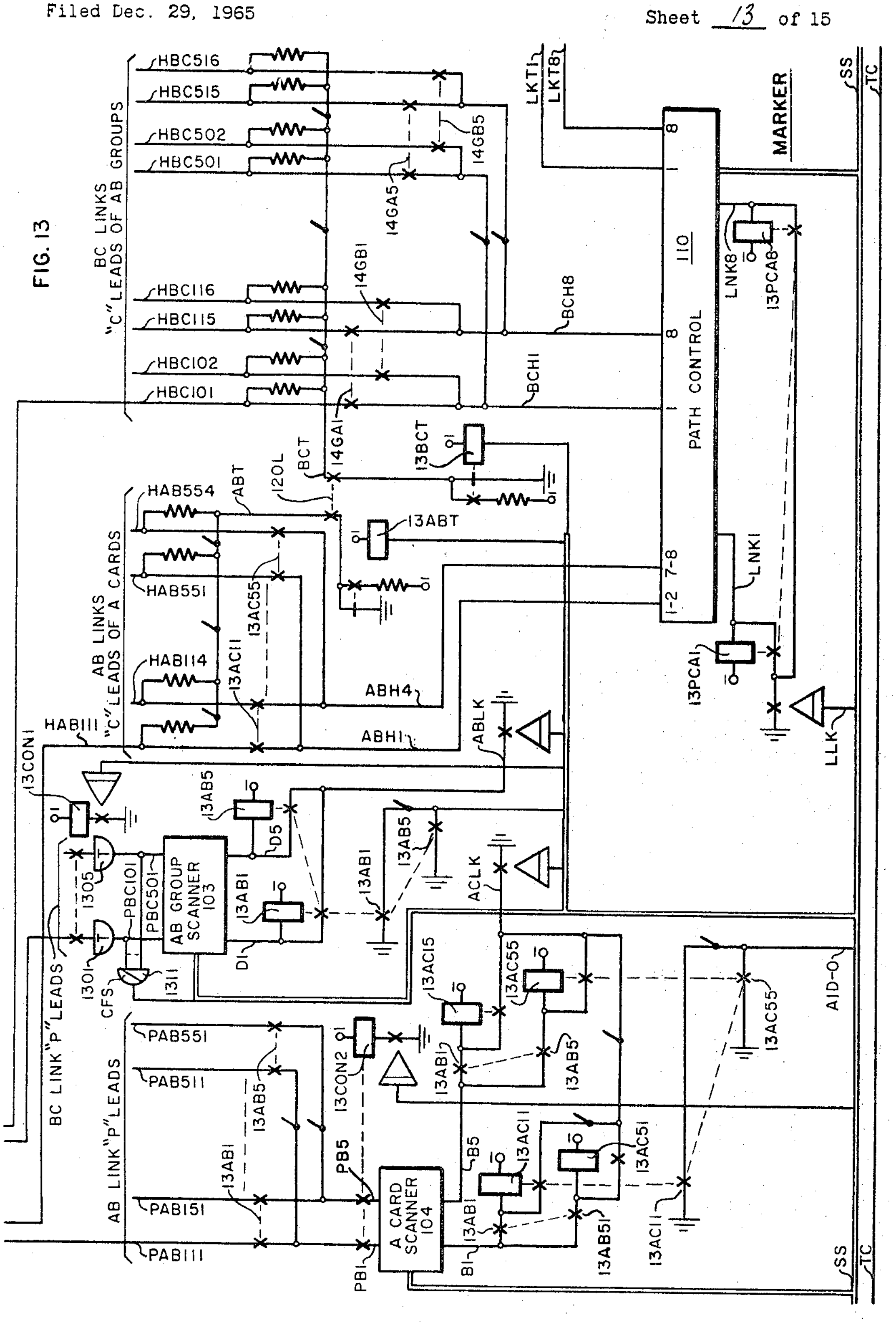
Figure 14:
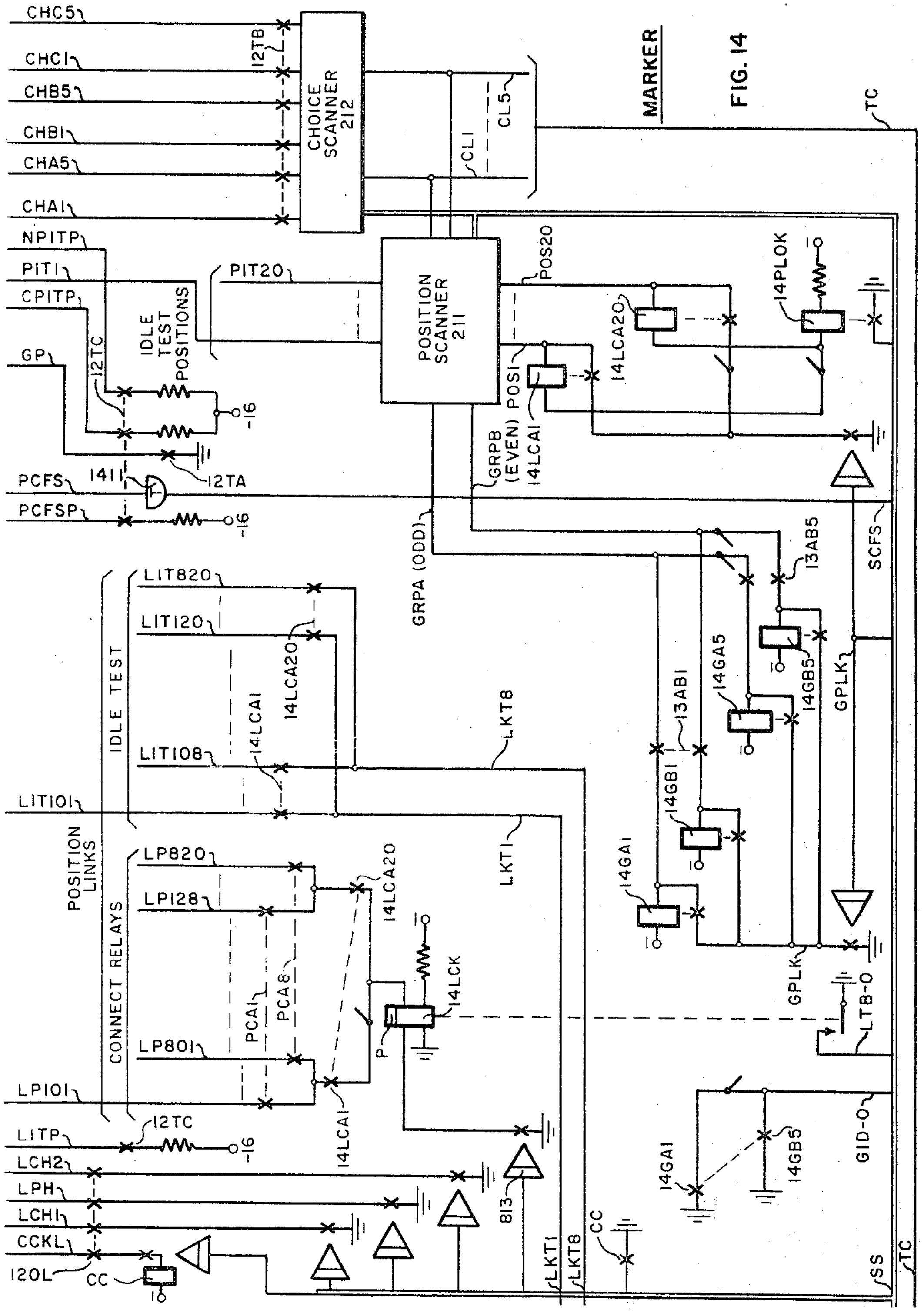

The DSA marker 1A, shown symbolically in FIGS. 1 and 2, is shown by a schematic and block diagram in FIGS. 12, 13 and 14.

The allotter 1AL causes the marker 1A to be on line for two minutes while the marker 1B is on standby, followed by two minutes with marker 1B on line and marker 1A on standby. When marker 1A is on line relay 12OL operates and completes a connection to the sequence and supervisory circuit 1200 for transfer relays 12TA, 12TB and 12TC. In the event of an emergency the maintenance and supervisory control unit 1MS can under manual control cause the allotter unit to transfer markers immediately. Otherwise, if a trouble occurs, the transfer will occur after the trouble recorder has been called in to register the trouble. The maintenance and supervisory unit has manual capabilities to busy out one marker to keep the other marker on line continually. Another aspect is that a transfer may be caused after the on line marker processes its call, if a transfer is desired, without affecting service. In addition a failed marker may be put on line when no calls for service exist to allow it to process a test call to a test position or vice versa. It can cycle in this test mode to allow trouble recording and scope trouble shooting.

The sequence and supervisory control unit 1200 contains a clock generator which gates a sequence counter through twenty-five states. In addition to the sequence state circuits, the sequence and supervisory unit 1200 supplies various supervisory logic control functions.

The various scanners contain counters comprising bistable flip-flop devices controlled by signals from the sequence circuits 1200 to scan the input conductors one at a time and to stop upon finding a given condition thereon to supply a corresponding output signal.

SEQUENCE PROGRAM IN NORMAL MODE—TRUNK CALL FOR SERVICE

The main program in the normal mode of the sequence circuits of the marker operates in response to a call for service from a DSA trunk to extend a connection to an operator position.

During *state S1*, all counters in the marker circuit are reset to an idle condition awaiting a call for service from a trunk or position. The ground signals are present on leads G and GP for recognition of a call for service at a trunk or position. When a call for service from a trunk occurs, negative potential appears via one of the five test gates 1301–1305 on one of the five conductors PBC101–PBC501 at the input of the AB group scanner 103. These signals are gated through an OR gate 1311 to produce a call for service signal CFS. After certain checks have been made the sequence counter in unit 1200 is advanced to state S2.

During *state S2* all of the incoming calls at the trunks are locked in by ground on the lead GLK. Next the ground on lead G is removed to inhibit other calls for service until all existing calls have been served. Then the existing calls with their gate relays locked are processed according to their priority and class of service. The priority scanner 101 is set to apply ground to lead PR4′, and the class scanner 102 is set to apply ground to lead CL1′.

During *state S3* the class of the incoming trunk circuit is sent to the choice scanner 212 to be gated with the output of the counter in the choice scanner to determine if a position is available. If none is available, the priority and class counters are advanced until the position is available and a call for service is still detected in the trunk control. If none are found for all priorities and class of service, the choice counter is advanced and a search begins until a position available and call for service signal are found.

During *state S4* the AB group scanner 103 is enabled to determine which one of the five inputs contains a call for service of the priority and class set by the scanners 101 and 102. When a call is found the scanner stops and the corresponding one of the relays 13AB1–13AB5 is operated, which gates a group of five PAB leads to the input of the A card scanner 104.

During sequence *state S5,* the A card scanner 104 is enabled to detect a call on one of the five leads PB1–PB5. One of the twenty-five relays 13AC11–13AC55 is operated in accordance with the output of the A card scanner 104 and the operated one of the relays from the output of the AB scanner 103. This causes five PLA conductors to be connected to the leads PA1–PA5 at the input of the trunk scanner 105.

During sequence *state S6,* the trunk scanner 105 is enabled to determine on which one of the five leads the negative potential appears. This scanner operates a corresponding one of the five relays 12T1–12T5.

During *state 7* negative potential is applied to lead ABT to test the AB link C conductors to insure that connections are complete to the path control 110.

During *state S8,* negative potential is applied to lead BCT to test the C leads from the AB group to determine if the connections are complete to the path control scanner 110.

During *state S9,* the position scanner 211 is enabled. This scanner contains five separate counters one for each class so that they advance per call in order that one position does not receive more calls than the others during a given period of time. Once an idle position is determined the scanner is stopped. At this time the corresponding scanner in marker 1B is advanced to bring it up to the same count. One of the twenty output relays 14LCA1–14LCA20 is operated. Also one of the relays 14GA1–14GB5 is operated. Half of the positions are in group one corresponding to the GA relays, and the other half are in group two corresponding to the GB relays. One of the relays is operated in accordance with the group designation from the position scanner 211 and the operated one of the relays from the AB scanner 103. These relays connect the C leads of the BC links to the leads BCH1–BCH8 to the path control scanner 110.

During sequence *state S10,* the scanner in the path control unit 110 is run to insure that all test voltages are present on all eight links to indicate correct operation to these links.

During sequence *state S11,* the path control scanner 110 is enabled to determine an available path through the switching network. Once an idle path is found the relay tree connections for pulling the path have been completed. The connection is then completed from lead TP and TP111 to operate the trunk connect relay in the DSA trunk D111, assuming that this is the trunk in which the call for service appeared. Also potential is applied via lead LP101, assuming that link 101 has been selected, to operate the link connect relay LCN. Next the pull battery is applied to the trunks via lead TPH.

During *state S12,* the pull ground is connected at lead LPH causing the path to be pulled. The busy detect relay 12BD is checked to insure it has not yet released to indicate the holding path across the network.

During sequence *state S13* the continuity is checked via leads CCKT and CCKL.

During *state S14,* the ground applied to check the hold cutoff relay during state S13 on the trunk side is removed, and the link cutoff relay is enabled to hold the connection through its own hold leads. The busy detect relay 12BD is checked during state S15 to insure that the connection is held when the pull potential is removed.

During *state S15,* the pull ground is removed, and the LP signal for the LCN relay. There is a check made for busy indication to insure that the trunk cutoff relay function properly indicating the path is held.

During *state S16,* the signal on lead TP is removed to drop the TCN connect relay in the trunk. The busy signal should move to not busy because it was gated via the trunk connect relay. The negative potential can be reapplied via conductors ABT and BCT. These potentials should not be gated to the path control scanner 110 because the locking relays for the C leads to the scanner are disengaged.

During sequence *state S17,* the pull negative potential on lead TPH is removed.

During *state S18,* the marker is clear.

SEQUENCE PROGRAM IN SWITCHBOARD MODE—OPERATOR POSITION CALL FOR SERVICE

The program for a call originating at a switchboard position is almost the same as the normal program for calls originating at the DSA trunks, with the exception that since there is no trunk call for service, its priority and class does not need to be determined. The procedure is to first determine which position is looking for service. Next to make all idle trunks look like they are calling for service. Then proceed with the normal program to find the first idle trunk which now is generating a call for service potential and connected to the position through the switching network. The end result is that the calling position is connected to an idle trunk. The program is as follows:

During *state S1,* the priority and class scanners 101 and 102 are not necessary. The sequence is advanced to state S22.

During *state S22,* the marking potential is disconnected from lead TNP and applied to lead TMP to mark all idle trunks to look like they are calling for service. Also the choice and class circuits are bypassed and at the position circuits the potential is applied to lead CPITP instead of to lead NPITP to locate the position which is calling for service via the position scanner 211.

The sequence is then advanced to state S4 and the program is continued in the same manner as already described for a call originating at a DSA trunk.

SUB-ROUTINES OF THE PROGRAM

There are various sub-routines to advance certain of the scanners when other of scanners complete their cycle without finding an idle indicating potential on any of its inputs.

Sub-routine 1 provides for looking for another position of the present choice and class, if a call for service is from a trunk and the present positions eight links do not have a path to that trunk.

Sub-routine 2 is used to look for another trunk calling for service if there is a position available for the present choice and class but no available path to it from the present trunk.

Sub-routine 3 is used to advance the priority and class scanner if no trunk of the priority and class of the present idle position is available.

Sub-routine 4 is used to select a new link if the selected connection does not pull correctly without continuity problems.

Sub-routine 5 is used for calls for service not processed, to use a new choice and class condition.

Sub-routine 6 is used for switchboard calls not processed returning to the clear condition.

PARITY OF CALL FOR SERVICE SIGNALS

A parity check arrangement is shown in FIG. 15, which compares the call for service signals of the two markers and indicates parity in each marker if the signals agree. As explained with reference to FIG. 4, the two markers use different P lead connections, and therefore different diodes in the DSA network 2. Also the source of negative potential to the DSA trunks via the leads TMP or TNP is supplied separately in each marker via its own resistors. Although not shown in the drawings, each marker also has the connection from these resistors to the −16 volt source separately fused. Therefore, a component failure can cause a trunk call for service signal to be received in one marker but not in the other.

It is desirable that a failure such as a bad diode in the switching network does not prevent a trunk call for service from being detected. If the active marker cannot act on a call signal, transfer to the standby marker should take place. Since any parity detecting circuit can be defective in such a manner that it continues to indicate satisfactory parity, two such detectors are provided, one per marker, as shown in FIG. 15. No attempt has been made to design the circuit to continuously compare the outputs since the comparison circuit could itself become defective. Rather, the parity circuit output is used only when its marker is active—which happens on a regular basis. Only if the parity circuit is bad and also the call for service circuit will the trouble condition exist. This possibility of two faults, although remote, will be detected unless the other parity circuit is defective—a highly unlikely three fault occurrence.

It would be possible to design the parity circuit with electronic gates, but feedback problems may arise from tying together the inputs of gates in different markers. Therefore relay circuitry is used to derive the exclusive-or function needed for a parity signal. Thus in marker 1A the call for service signal CFS drives a relay driver 1501 which operates the parity check relay 15PA, and in marker 1B the call for service signal CFS–B via relay driver 1502 operates the parity check relay 15PB. With both relays operated the circuit to lead PAR in marker 1A and to lead PAR–B in marker 1B are open, which corresponds to a true signal. In marker A the gate 1511 which has the function ($\overline{PAR}$ S1 $\overline{SCFS}$ $\overline{CFS}$ EOL) is inhibited and therefore does not generate a parity fault signal at its output. There is a similar gate, not shown, in marker 1B. The signal EOL (electronic on line) is true whenever the marker is in the active on line condition. The signal S1 is true during sequence state S1.

Considering now the possible signal conditions in the parity check circuit of marker 1A when it is active, there are four possible combinations of a call for service signal and parity signal as follows:

$$CFS \cdot PAR$$
$$\overline{CFS} \cdot PAR$$
$$CFS \cdot \overline{PAR}$$
$$\overline{CFS} \cdot \overline{PAR}$$

In the first two cases parity is true so the marker remains in the active on line condition. In the third case there is a call for service signal but parity is false, indicating that the other marker 1B did not receive the call for service signal. In this case the information does not indicate which marker has a trouble condition, so the active marker 1A is left in the active condition on line to process the call unit it stops at some point in the sequence, at which time more information about the fault is available to record in the trouble recorder, after which transfer can be initiated. In the fourth situation there is no call for service signal and parity is false in this marker. Since there is no call for service signal there is no basis for processing the call in this marker. However the false parity indicates that the other marker has received a call for service signal, and therefore in this situation transfer to the other marker should be initiated to permit it to attempt to process the call.

Essentially similar operation of the parity check circuit is obtained on a switchboard call for service. The signal SCFS via relay driver 1503 operates the parity check relay 15PA in marker 1A and in like manner the parity check relay 15PB in marker 1B is operated. If a call for service signal is received in one marker and not in the other then only one of the two parity check relays 15PA and 15PB will be operated placing ground potential, a false signal value, on the leads PAR in marker 1A and lead PAR–B in marker 1B. If the signal was not received in marker 1A the signal CFS will be not true and also the signal SCFS is not true since there is no switchboard call at this time. Thus the gate 1511 is enabled to produce a true output signal generating signal PARF which is sent via the test access circuit to a recorder, and also the relay driver 1512 operates to close its contact to complete a circuit to the maintenance supervisory circuit 1MS.

By way of example assume that the parity output of marker A is open such that the signal stays always true, and that then a second fault, as a contact of relay 13CON (FIG. 13) staying open occurs, so that marker A does not receive the call for service signal at the output of gate 1511 but because of the fault in the parity circuit the parity output signal in marker A remains true. When normal transfer to marker B occurs, the signal PAR–B will be false and cause the call for the trouble recorder to be generated. Analysis will pinpoint the bad contact of relay 13CON1 but ignore the fault in the marker 1A parity circuit. To alleviate this problem, the output of both parity circuits is transmitted via the test access circuit when the trouble recorder is called in.

Thus a parity check circuit arrangement has been provided which is particularly useful in the arrangement in which two markers are provided with only one on line at a time with transfer from one marker to the other occurring periodically, for example at two minute intervals.

While I have described above the principles of my invention in connection with specific apparatus, it is to be clearly understood that this description is made only by way of example and not as a limitation to the scope of my invention.

The signaling arrangement disclosed herein for transferring information between the DSA trunks and operator position circuits is claimed in a copending application Ser. No. 535,404 filed Mar. 18, 1966 by Robert M. Schildgen et al. for a Time Division Signaling Arrangement assigned to the same assignee as this application.

What I claim is:

1. A class-of-service communication switching system including a set of terminal circuits and a marker, each terminal circuit having a marking conductor and means to connect a first marking potential thereto to mark it for possible selection by the marker, a plurality of class-of-service conductors corresponding individually to a given number of classes of service and coupled from the marker to the marking conductor of each of said terminal circuits, means in the marker to select said classes of service for service, one at a time, and for each selection mark the corresponding class-of-service conductor to apply a second potential to the terminal-circuit marking conductors and thereby blank any first-potential thereon, each said terminal circuit having class-of-service designating means to block the coupling of its marking conductor to the one of said class-of-service conductors corresponding to a designated class of service, and means in the marker to select for service, one at a time, terminal circuits having unblanked first potential on their marking conductors.

2. A class of service communication switching system as claimed in claim 1, wherein said class-of-service designating means comprises a relay arrangement in each terminal circuit, wherein said class-of-service conductors are coupled to the marking conductor in each terminal circuit via contacts of said relay arrangement in series with diodes poled for forward conduction from class-of-service conductors at said second potential to a marking conductor at said first potential;

and wherein said means to block the coupling of the marking conductor to one of the class-of-service conductors comprises said contacts of said relay arrangement operated in accordance with the class-of-service designation to disconnect the corresponding class-of-service conductor from the marking conductor.

3. A class-of-service communication switching system as claimed in claim 2, wherein there are a first set and a second set of said class-of-service conductors for a first type and a second type of class of service respectively, wherein said marker is arranged to select and mark with said second potential one conductor from each of said sets at any one time;

and wherein said class-of-service designating relay arrangement in each terminal circuit has contacts arranged to disconnect one conductor of each set from its marking conductor in accordance with a class-of-service designation of each of said types.

4. A class-of-service communication switching system as claimed in claim 3, further including a plurality of operator position circuits;

each position circuit having a marking conductor and means to connect the first marking potential thereto to mark it for possible selection by the marker;

a third set of class-of-service conductors coupled from the marker to the marking conductor of each of said position circuits, means in the marker to select, one at a time, and mark one of the conductors of said third set to apply a second potential to the position-circuit marking conductors and thereby blank any first potential thereon;

each position circuit having means to block the coupling of its marking conductor to at least one of the conductors of said third set, and means in the marker to select for service a position circuit having unblanked first potential on its marking conductor;

and a switching network controlled by the marker to connect any one selected terminal circuit to any one selected position circuit.

5. A class-of-service communication switching system as claimed in claim 4, wherein said first type of class of service designates the priority of a call at a terminal circuit, and the second type designates the class of call for the operators;

means in the marker to select successive choices of position for each class of call, each conductor of said third set being individual to a class of call-choice combination, the class of call marking at the third set of conductors in the marker being in accordance with the selection of the class of call used to mark the second set of conductors in combination with the choice selection;

each position circuit having means to disconnect any number of the conductors of the third set from its marking conductor in accordance with the class of call-choice combinations to be handled at that position.

6. A class-of-service communication switching system as claimed in claim 5, wherein there is a plurality of link circuits associated with each position circuit, and said switching network is arranged to connect any one of said terminal circuits to any one of said link circuits, said switching network connection to a position circuit being via one of its link circuits, wherein each position circuit further includes means to initiate a call for service and responsive thereto to signal the marker and to connect its marking conductor to a calling conductor, means in the marker responsive to a position-circuit call for service signal to supply first potential to the calling conductor to all position circuits, and to mark all idle terminal circuits as calling for service, and means in the marker to then establish a connection from an idle trunk circuit to one of the position circuits calling for service in the same manner as though a terminal circuit were calling for service.

7. In a communication switching system having a switching network with a first group of terminals at one side thereof and a second group of terminals at the other side thereof with a marker to selectively establish connections through the network to connect any terminal of the first group to any terminal of the second group;

means in the marker responsive to a call for service at at least one of the terminal circuits of the first group to operate in a first mode with a sequence of operations to identify one terminal of the first group calling for service, to select an idle terminal of the second group, and to cause the connection through the switching network to be completed between the identified terminal of the first group and the selected terminal of the second group;

and means responsive to a call for service from at least one terminal of the second group to operate in a second mode to mark all idle terminals of the first group as calling for service, to mark only the calling terminals of the second group to appear idle to the marker, and to then operate in the same sequence of operations as in the first mode to identify one of the terminals of the first group now marked to appear as calling, to select one of the terminals of the second group now marked to appear idle, and to establish the connection between the identified one terminal of the first group and the selected terminal of the second group, whereby a connection is established between the calling terminal of the second group and an idle terminal of the first group.

8. A communication switching system as claimed in claim 7, wherein said terminals of the second group are link circuits associated with operator position circuits, wherein said call for service from the second group of terminals is a call for service at at least one operator position, and wherein said marker sequence of operations for selecting a terminal of the second group comprises first selecting a position circuit marked idle, and then selecting an idle one of the link circuits associated with that position.

References Cited

UNITED STATES PATENTS 3,204,036 8/1965 Bray et al.

WILLIAM C. COOPER, *Primary Examiner.*

U.S. Cl. X.R.

179—18